(12) United States Patent
Martineau et al.

(10) Patent No.: US 11,422,090 B2
(45) Date of Patent: Aug. 23, 2022

(54) PHASE PLATE FOR HIGH PRECISION WAVELENGTH EXTRACTION IN A MICROSCOPE

(71) Applicant: University of Utah Research Foundation, Salt Lake City, UT (US)

(72) Inventors: Jason Martineau, Salt Lake City, UT (US); Jordan Gerton, Salt Lake City, UT (US); Erik Jorgensen, Salt Lake City, UT (US); Tim Allen, Salt Lake City, UT (US)

(73) Assignee: University of Utah Research Foundation, Salt Lake City, UT (US)

(*) Notice: Subject to any disclaimer, the term of this patent is extended or adjusted under 35 U.S.C. 154(b) by 337 days.

(21) Appl. No.: 16/593,829

(22) Filed: Oct. 4, 2019

(65) Prior Publication Data

US 2020/0110030 A1 Apr. 9, 2020

Related U.S. Application Data

(63) Continuation-in-part of application No. PCT/US2018/026010, filed on Apr. 4, 2018.
(Continued)

(51) Int. Cl.
*G01N 21/64* (2006.01)
*G02B 21/16* (2006.01)
*G02B 21/36* (2006.01)

(52) U.S. Cl.
CPC ........... *G01N 21/64* (2013.01); *G02B 21/16* (2013.01); *G02B 21/361* (2013.01)

(58) Field of Classification Search
CPC .............. G02B 27/1066; G02B 27/10; G02B 27/0938; G02B 27/09; G02B 27/0025;
(Continued)

(56) References Cited

U.S. PATENT DOCUMENTS 8,040,608 B2 * 10/2011 Evans ................ G02B 21/0064
359/589
8,212,866 B2 7/2012 Lemmer et al.
(Continued)

FOREIGN PATENT DOCUMENTS

JP 2003/167198 A 6/2003
JP 2003167198 * 6/2003
(Continued)

OTHER PUBLICATIONS

Gustavsson et al.; "3D Single-molecule super-resolution microscopy with a tilted light sheet." Nature Communications; Published Jan. 9, 2018; vol. 9, Article No. 123; 8 Pages.
(Continued)

*Primary Examiner* — John R Lee
(74) *Attorney, Agent, or Firm* — Thorpe North and Western LLP

(57) ABSTRACT

A phase plate for high precision wavelength extraction can include a planar substrate which has a point spread function engineered profile formed of a tessellation of regions. The point spread function engineered profile transforms a point spread function of a light source to form a wavelength dependent geometric pattern. The geometric pattern can also preserve spatial location information of the light source. Such a phase plate permits extracting three-dimensional position and the wavelength of a point emitter.

18 Claims, 26 Drawing Sheets

Related U.S. Application Data

(60) Provisional application No. 62/481,505, filed on Apr. 4, 2017.

(58) Field of Classification Search
CPC .... G02B 27/00; G02B 21/02; G02B 21/0064; G02B 21/0052; G02B 21/00; G02B 5/04; G02B 5/00; G02B 3/02; G02B 21/361; G02B 21/16; G01N 2021/6473; G01N 21/6471; G01N 21/6463
See application file for complete search history.

(56) References Cited

U.S. PATENT DOCUMENTS

| | | | |
|---|---|---|---|
| 8,390,928 B2* | 3/2013 | Baer | G01N 21/64 359/489.01 |
| 8,586,945 B2 | 11/2013 | Reuss et al. | |
| 8,693,742 B2 | 4/2014 | Piestun et al. | |
| 9,250,185 B2 | 2/2016 | Sirat | |
| 9,310,595 B2 | 4/2016 | Iketaki et al. | |
| 9,523,846 B2 | 12/2016 | Soeller et al. | |
| 9,703,211 B2* | 7/2017 | Menon | G03F 7/70325 |
| 9,810,893 B2 | 11/2017 | Backer et al. | |
| 9,864,182 B2 | 1/2018 | Kleppe et al. | |
| 9,874,737 B2 | 1/2018 | Best et al. | |
| 10,739,602 B2* | 8/2020 | Engelhardt | G02B 21/06 |
| 10,827,915 B2* | 11/2020 | Roichman | A61B 1/0005 |
| 10,935,501 B2* | 3/2021 | Smith | G01B 9/02081 |
| 10,963,006 B2* | 3/2021 | Fletcher | H04N 5/2257 |
| 10,974,061 B2* | 4/2021 | Iguchi | A61F 13/00 |
| 10,983,555 B2* | 4/2021 | Fletcher | G06F 3/012 |
| 11,036,037 B2* | 6/2021 | Hillman | G02B 21/0048 |
| 2009/0059360 A1* | 3/2009 | Evans | G02B 21/0064 359/370 |
| 2012/0257037 A1* | 10/2012 | Raicu | G02B 21/002 348/79 |
| 2013/0286181 A1 | 10/2013 | Betzig et al. | |
| 2014/0346766 A1 | 11/2014 | Walter et al. | |
| 2015/0323787 A1 | 11/2015 | Yuste et al. | |
| 2016/0048032 A1 | 2/2016 | Soskind et al. | |
| 2016/0125610 A1 | 5/2016 | Piestun | |
| 2016/0231553 A1 | 8/2016 | Piestun et al. | |
| 2016/0301914 A1 | 10/2016 | Shechtman et al. | |
| 2016/0320305 A1* | 11/2016 | Chen | G01J 3/0267 |
| 2016/0327779 A1* | 11/2016 | Hillman | G02B 21/0052 |
| 2017/0038574 A1 | 2/2017 | Zhuang et al. | |
| 2017/0176338 A1 | 6/2017 | Wu et al. | |
| 2020/0110030 A1* | 4/2020 | Martineau | G02B 21/361 |
| 2021/0096025 A1* | 4/2021 | Allen | G01J 3/0205 |
| 2021/0102686 A1* | 4/2021 | Robinson | G02B 6/0055 |
| 2021/0208073 A1* | 7/2021 | Sirat | G02B 21/0076 |
| 2021/0373311 A1* | 12/2021 | Hillman | G02B 21/0048 |

FOREIGN PATENT DOCUMENTS

| | | |
|---|---|---|
| WO | WO 2005/116716 A | 12/2005 |
| WO | WO 2006/097063 A1 | 9/2006 |

OTHER PUBLICATIONS

Hershko et al.; "Multicolor localization microscopy and point spread-function engineering by deep learning." Optics Express; Optical Society of America; Mar. 4, 2019; vol. 27, No. 5; pp. 6158-6183.

PCT Application No. PCT/US18/26010 Filing date Apr. 4, 2018 Jason Martineau International Search Report, dated Jul. 9, 2018, 10 Pages.

Munagavalasa et al.; "Spatial and spectral imaging of point-spread functions using a spatial light modulator." Optics Communications; Elsevier; Dec. 2017; vol. 404; pp. 51-54.

Shechtman et al.; "Observation of live chromatin dynamics in cells via 3D localization microscopy using Tetrapod point spread functions." Biomedical Optics Express; Dec. 1, 2017; vol. 8, Issue 12; 14 Pages.

\* cited by examiner

PHASE PLATE FOR HIGH PRECISION WAVELENGTH EXTRACTION IN A MICROSCOPE

RELATED APPLICATION

This application is a continuation-in-part application of PCT International Application No. PCT/US18/26010, filed Apr. 4, 2018 which claims the benefit of U.S. Provisional Application No. 62/481,505, filed Apr. 4, 2017, the contents of which are incorporated by reference for all purposes.

GOVERNMENT INTEREST

This invention was made with government support under Grant Number 1309041 awarded by the National Science Foundation. The government has certain rights in the invention.

BACKGROUND

Localization microscopy (LM) techniques such as Stochastic Optical Reconstruction Microscopy (STORM) Imaging and Photoactivated Localization Microscopy (PALM) have become important tools for studying cells at nanometer length scales. Moreover high-speed sCMOS cameras have allowed LM to obtain useful data on very small time scales. However, observation of the motions of three or more different proteins using LM can be difficult because of the broadness of the emission spectra of fluorescent tags. Fluorescent dyes that blink well tend to emit in the red or far red ($\lambda$>600 nm). In the case of three or more dyes at the red end of the spectrum, the level of cross talk can be unacceptably high.

SUMMARY

According to the present technology, a phase plate for a microscopy imaging system can include point-spread function (PSF) engineering to induce a wavelength-dependent PSF when placed in the Fourier plane of a microscope. A phase plate for a microscope system can comprise a planar substrate which is transparent to a wavelength of light passing through a bottom surface, a substrate body, and a top surface of the substrate. The top surface can include a point spread function engineered profile formed as a segmented array of regions including at least a first tier region and a second tier region. The first and second tier regions also each have a different thickness that transforms a point spread function of the wavelength of light to form a wavelength dependent geometric pattern.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1A:
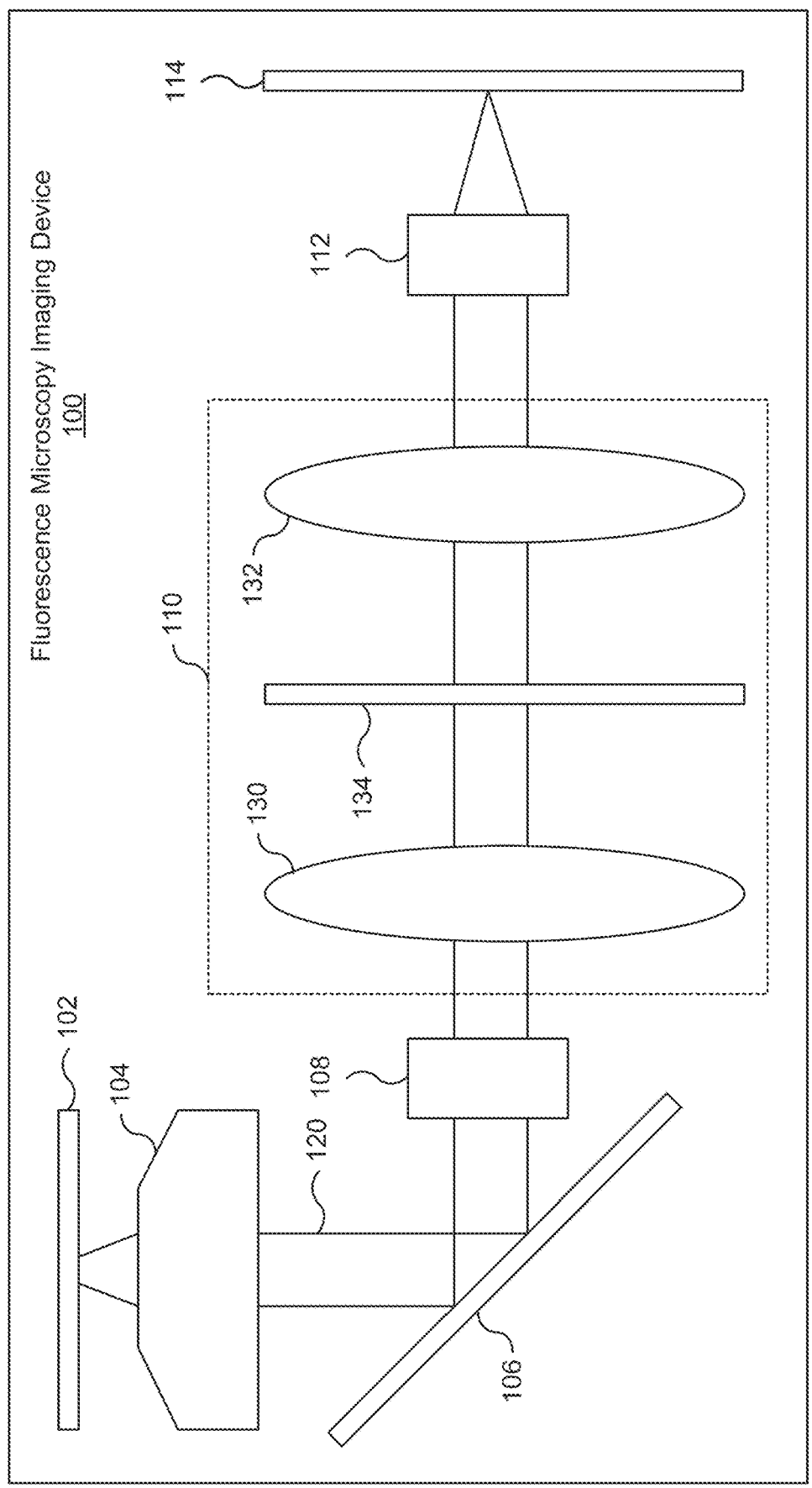
FIG. 1A is a schematic diagram of a fluorescence microscopy imaging device including a phase plate according to one aspect of the present invention.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a region" includes reference to one or more of such materials and reference to "directing" refers to one or more such steps.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 5%, and most often less than 1%, and in some cases less than 0.01%.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements are also considered to be directly contacting each other.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of" For example, "at least one of A, B and C" explicitly includes only A, only B, only C, and combinations of each.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Phase Plate for High Precision Wavelength Extraction in a Microscope

A microscope device that can incorporate a phase plate according to the present embodiment is one that uses localization microscopy such as Stochastic Optical Reconstruction Microscopy (STORM) Imaging and Photo-activated Localization Microscopy (PALM). In one example, a dye can be used to mark a specimen. The specimen can be illuminated using a light source. Fluorescence from the dye can be passed through a phase plate placed in the Fourier plane of the microscope. The phase plate can transform a point spread function of a wavelength of light to form a wavelength dependent geometric pattern.

FIG. 1A is diagram of a fluorescence microscopy imaging device 100 according to one aspect of the present invention. The fluorescence microscopy imaging device 100 can provide localization microscopy such as STORM and PALM. The fluorescence microscopy imaging device 100 can include an observation system 102, and objective 104, a mirror 106, a pre-optical processing stage 108, an optical processing stage 110, a post-processing stage 112, and an imaging system 114. Alternatively, the microscopy imaging device can be other types of optical microscope, stereo microscopes, or any imaging system, including telescopes used for measuring the spectral properties of celestial objects, such that the Fourier plane (also called the pupil plane) may be fitted with a phase plate, which modifies the point-spread function of that imaging system to render it sensitive to a detected signals wavelength.

One or more ambient, indirect, or direct illumination sources (not shown) can be used to illuminate, activate, or deactivate a sample under observation using the observation system 102 according to known LP and superresolution microscopy techniques. Objective 104 can capture light emitted by the sample under observation using the observation system 102. The emitted light 120 can follow a path from the objective 104 as directed by mirror 106 through the pre-optical processing stage 108, the optical processing stage 110, the post-optical processing stage 112, and to the imaging system 114.

The mirror 106 and the pre-optical processing stage 108 can handle the emitted light 120 prior to the emitted light 120 passing to the optical processing stage 110. The mirror 106 and the pre-optical processing stage 108 may include one or more stage elements that perform one or more operations with the emitted light 120 prior to the emitted light 120 passing to the optical processing stage 110. Some examples of operations performed with the emitted light 120 can include transmission, reflection, refraction, deflection, diffraction, polarization, depolarization, collimation, filtering, spatial filtering, spectral filtering, focusing, defocusing, fiber coupling, fiber decoupling, higher order harmonic mode generation, three wave mixing, four wave mixing, optical parametric amplification, Spontaneous parametric down-conversion, and the like.

The optical processing stage 110 can include a first optical system 130, a second optical system 132, and a phase plate system 134. The first optical system 130 can handle the emitted light prior to the emitted light 120 passing to the phase plate system 134. The first optical system 130 can include one or more stage elements that perform one or more operations with the emitted light 120 received from the mirror 106 and the pre-optical processing stage 108. The second optical system 132 can handle the emitted light 120 prior to the emitted light 120 passing to the post-optical processing system 112. The second optical system 132 can include one or more stage elements that perform one or more operations with the emitted light 120 received from the phase plate system 134.

Figure 1B:
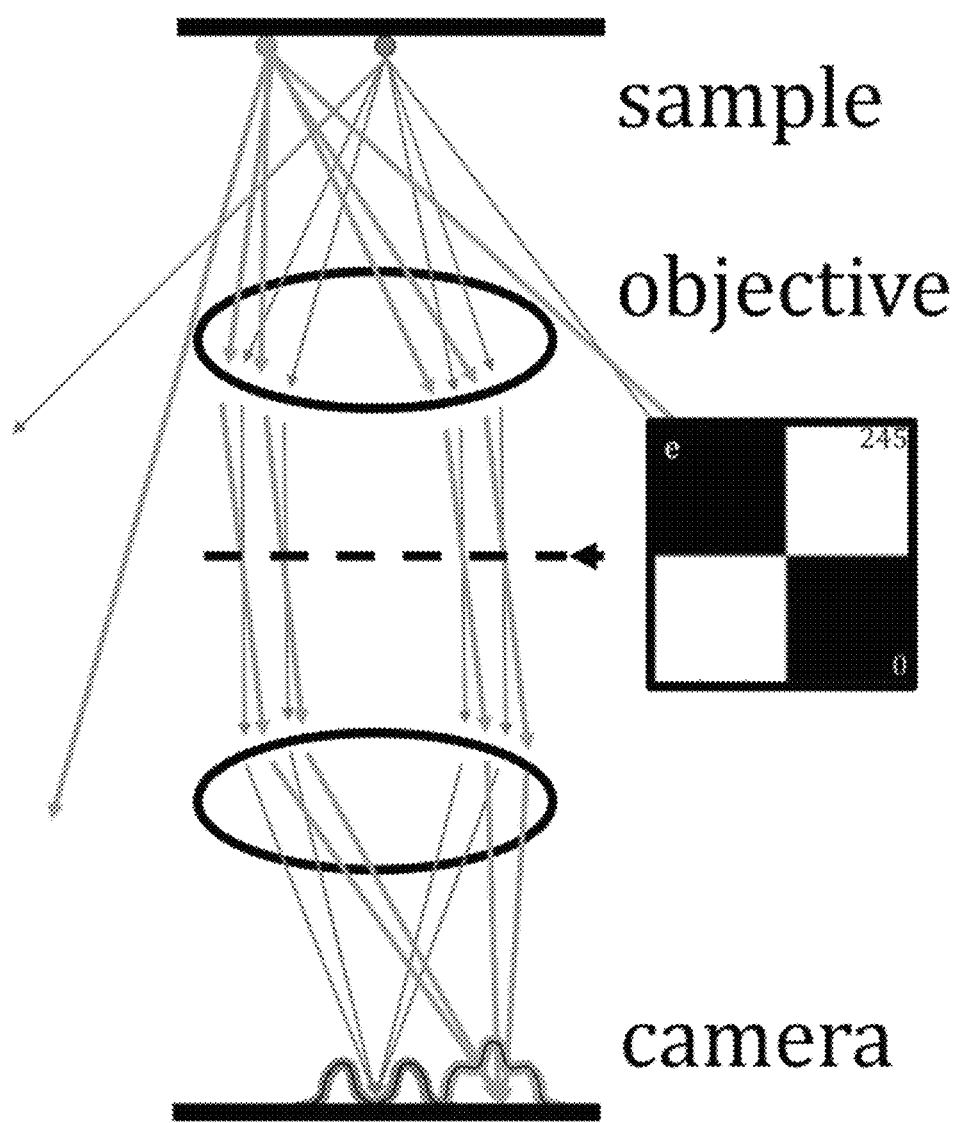
FIG. 1B is a diagram of an imaging device including a phase plate according to one aspect of the present invention.

Regardless of the specific microscopy system, the phase plate 134 can be oriented at the Fourier plane of the objective system. FIG. 1B is a diagram of an imaging device including a phase plate according to one aspect of the present invention. At the Fourier plane (e.g. Fourier transform plane) the spatial image is transformed into a spatial frequency spectra. Effectively, the lens has performed a two-dimensional Fourier transform at that point. This fact derives from the mathematical description of a light passing through a lens. For length scales relevant to optical microscope design and construction (~0.1 cm-10 cm, roughly) the propagation of light is approximated by the so-called Fresnel diffraction integral. When this integral is solved in the presence of a lens (i.e. evaluated for light passing through a lens) the form of the integral simplifies to that of a two-dimensional Fourier transform. In this sense, then, the PSF is the magnitude of the frequency spectrum of the light in the Fourier plane which is also sometimes called the pupil plane. The Fourier plane occurs at one focal length away from lens 130. This fact falls out of the simplification of the Fresnel diffraction integral into its Fourier transform approximation. However, it is the only position in an infinity corrected optical system consisting of two lenses at which all of the detected light from different locations on a sample is coincident.

The phase plate 134 can include one or more stage elements that transform a wavelength of the emitted light 120 into a wavelength dependent geometric pattern. The phase plate 134 can be placed in the Fourier plane of the fluorescence microscopy imaging device 100 to modify the form of a point spread function of a point emitter. As a general guideline, the phase plate can be oriented within 10% of the Fourier plane, in some cases within 3%, and most often within 1%. The phase plate system 134 can cause a point spread function of a point emitter to have a wavelength dependent geometric pattern. The wavelength dependent geometric pattern can include a recognizable shape for each wavelength of light, such as one distinguishable by eye or via a computer vision model. The phase plate system 134 can produce a unique or semi-unique shape-to-color mapping that enables the fluorescence microscopy imaging device 100 or user to distinguish different colors.

The phase plate system 134 can include an etched piece of glass or other substrate transparent to some wavelength of light on which a thickness of dispersive, transparent material has been deposited, layered, or spin-coated. The phase plate system 134 can be etched, or layered, in one or more ways to modify the form of the point spread function of the point emitter when placed in the Fourier plane. The phase plate system 134 can include a planar substrate being transparent to a wavelength of light passing through a bottom surface, a substrate body, and a top surface of the substrate. The top surface of the substrate can include a point spread function engineered profile formed as a segmented array of regions which include multiple tier regions having varied tier heights. The tier regions can have different thicknesses that transform a point spread function of the wavelength of light to form a wavelength dependent geometric pattern. Generally, the PSF engineered profile can form a segmented tessellation or tiling of adjacent regions. Generally, the PSF engineering profile can have a pattern based on a regular tessellation which can be square, rectangular, triangular, hexagonal, rhombus, or the like; a semiregular tessellation such as squares and octagons or the like; an arbitrary irregular tessellation; or a non-periodic tilings like a Penrose tiling. Most often, the profile can be a regular square tessellation in which each region has a tier height which is independent of other regions. But more generally, the adjacent regions can be oriented within one of the tiling or tessellation patterns mentioned above. The tier heights and number of regions can be chosen to produce various wavelength dependent geometric patterns. In one example, the PSF engineering profile can be based on a regular square grid (e.g. 2×2, 3×3, 4×4, etc).

In some cases, the profile can have a radially symmetric pattern about a central axis of the top surface. Alternatively, or in addition, the profile can have a reflection symmetry along a symmetry axis. Furthermore, in some cases, the geometric pattern can maintain a spatial center of mass such that spatial position information of the original point light source are retained by the geometric pattern.

The first optical system 130, the second optical system 132, or the phase plate system 134 can include one or more elements that modify the slope of a dispersion curve. For example, the phase plate system 134 can include one or more films, layers, or optical elements that increase the slope of the dispersion curve (the index of refraction as a function of wavelength). The phase plate system 134 can include index of refraction engineering to increase the sensitivity (information content) within a range of wavelengths. For example, a material or meta-material with favorable transmission properties that has a large change in index of refraction over some small but experimentally important optical wavelength band might be used to increase the rate by which the PSF of light within that special range of wavelengths changes in response to a hypothetical change in wavelength, within the aforementioned optical band.

Referring again to FIG. 1A, the optical processing stage 110 can handle the emitted light 120 to transform a point spread function of a wavelength of light to form a wavelength dependent geometric pattern. The optional post-optical processing stage 112 can handle the emitted light 120 prior to the emitted light 120 passing to the imaging system 114. The post-optical processing stage 112 can include one or more stage elements that perform one or more operations with the emitted light 120 prior to the emitted light 120 passing to the imaging system 114. For example, spectral filtering, polarizer elements, spherical lenses, cylindrical lenses, beam apodizing elements, and the like can be used.

The imaging system 114 can handle imaging of the emitted light 120 received from the post-optical processing stage 112. The imaging system 114 can include one or more image capture elements such as, but not limited to, CMOS, sCMOS, CCD, and the like. The imaging system 114 can also include one or more image processing elements for processing images captured from the emitted light 120 to produce a visually displayed image or to perform data analysis in order to perform pattern recognition on the captured image. In this manner, the captured geometric patterns can be correlated to specific wavelengths manually (e.g. visually by a user) or automated via standard pattern recognition algorithms. Accordingly, the imaging system 114 can optionally further include one or more image analysis elements for analysis of images captured from the emitted light 120.

An image captured by the imaging system 114 can include information about a point emitter in the sample under observation using the observation system 102. The image captured by the imaging system 114 may include a wavelength dependent geometric pattern associated with a wavelength of light emitted by the point emitter. The wavelength dependent geometric pattern of the point emitted can provide spatial and wavelength information. For example, the wavelength dependent geometric pattern of the point emitter can correspond to a predetermined wavelength of light. In another example, the wavelength dependent geometric pattern can provide spatial information, such as two-dimensional or three-dimensional coordinates of the point emitter.

Figure 2A:
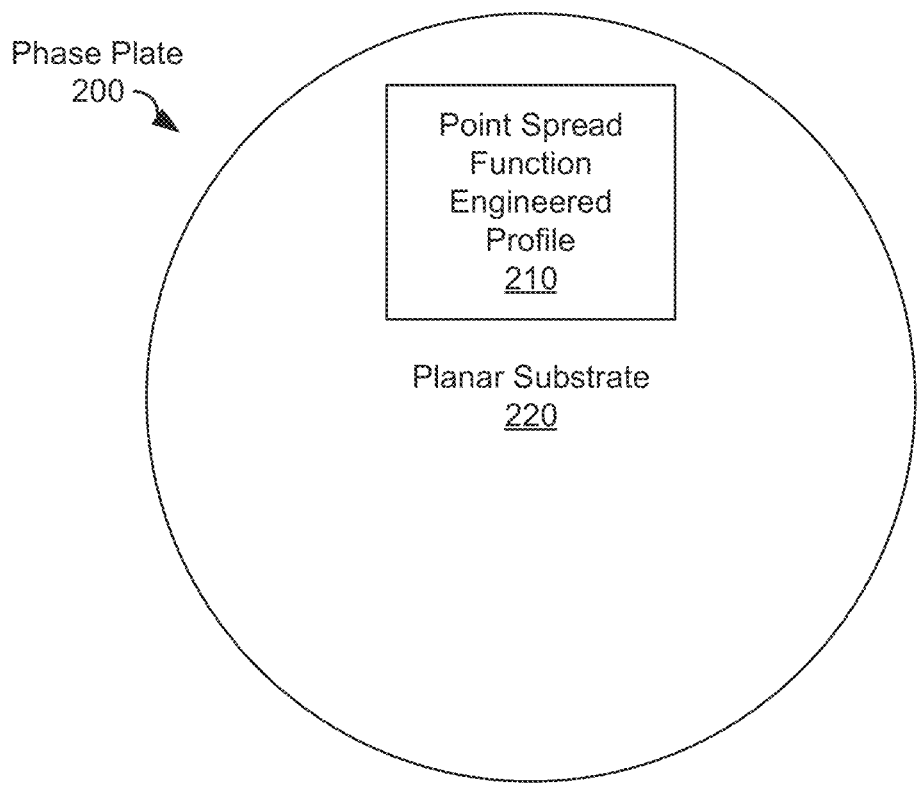
FIGS. 2A-2B are plan and perspective views of a phase plate for high precision wavelength extraction according to one aspect of the present invention.
Figure 2B:
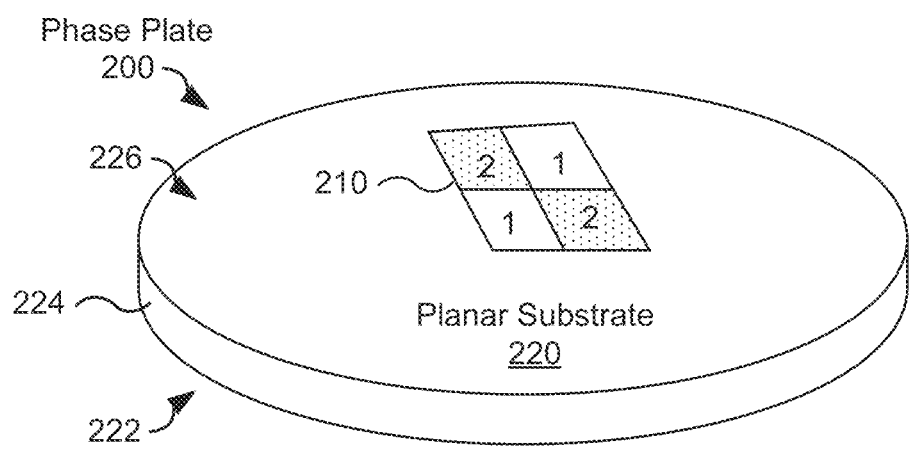

FIGS. 2A-2B are illustrations of a phase plate 200 for high precision wavelength extraction according to one example of the present invention. In this example, the phase plate 200 includes a point spread function engineered profile 210. The phase plate 200 can have any shape suitable for use with the fluorescence microscopy imaging device 100 of FIG. 1A. For example, the phase plate 200 can have a circular, elliptical, or polygonal shape. Regardless, the PSF engineered profile 210 can be sized and oriented appropriately to receive and modify light from a desired point source.

The phase plate 200 can include a planar substrate 220 transparent to a wavelength of light passing through a bottom surface 222, a substrate body 224, and a top surface 226 of the substrate 220. In one example, these portions can be formed from a single monolithic piece which is homogeneous throughout having no discontinuities in materials. Alternatively, the phase plate can be formed of layers (i.e. in a direction parallel to the light path). Alternatively, or in addition to layers, the phase plate can be formed with regions of varied adjacent materials (i.e. in a direction transverse to the light path). The planar substrate 220 can include one or more materials which are transparent to one or more wavelengths of electromagnetic radiation. Some non-limiting examples of materials used to construct substrate 220 can include silicon dioxide ($SiO_2$), glass, quartz, mica, sapphire, photoresist, and the like.

The bottom surface 222, the top surface 226, or a combination of both, can be formed to produce a smooth surface. The smooth surface can typically have a surface roughness less than about 4 nm, and most often less than about 3 nm (as measured as RMS roughness). Such a smooth surface can be formed using any suitable technique. Non-limiting examples include plasma enhanced chemical vapor deposition (PECVD) which is particularly effective, physical vapor deposition, ion beam deposition, and the like. The bottom surface 222, the top surface 226, or a combination of both, can include one or more regions formed using the addition of material to or the subtraction of material from the substrate body 224.

In this example, the top surface 226 of the substrate body 224 has been processed to form the point spread function engineered profile 210. The point spread function engineered profile 210 can include at least a first tier region and a second tier region. A tier region can include one of a series of structures or voids at a level relative to a fixed position, such as relative to one of the surfaces 222, 226 or another tier region. The first tier region, denoted by the number 1 in FIG. 2B, can include one or more regions of the top surface 226 having a first thickness relative to one or more regions of the top surface 226 forming the second tier region, denoted by the number 2, having a second thickness. The top surface 226 can include the first tier region with the second tier region formed at approximately one (1) micrometer above the first tier region. Thus, the first tier region can have a thickness equal to that of the substrate body.

As a general guideline applicable to any example phase plates described herein, the phase plate can have a light transmission thickness (e.g. substrate thickness plus region thickness above the substrate) which is from about 1 to about 2 mm, and often from about 1 to about 1.001 mm. Furthermore, adjacent regions can generally have a step differential within about 10 μm, and most often within about 3 μm of one another.

The tier regions of the point spread function engineered profile 210 can be arranged to form wavelength dependent geometric patterns. In one example, as shown in FIG. 2B, the tiers of the first and second tier regions alternate about a central axis of the point spread function engineered profile 210. Other arrangements of the tiers are contemplated and can be used consistent with these principles. For example, the tier heights can increase at regular or irregular intervals traveling clockwise around the center; the tier heights can be such that the top left tier is the thinnest, the bottom left and top right tiers are equal in height and thicker than the top left tier, and the bottom right tier is the thickest of all; the bottom left tier may be the thinnest, the top left tier thicker than the bottom left, and the bottom and top right tiers are thicker than their left counterparts by some constant factor. Additionally, the point spread function engineered profile 210 can include multiple tier regions, and in some cases more than two regions. Although there is no theoretical upper limit to the number of tier regions, most applications can be effectively handled with two to four tier heights and four to sixteen tier regions.

The phase plate 200 can allow for the high-precision differentiation of wavelengths of light in the fluorescence microscopy imaging device 100 without the need to polarize the emitted light 120 or to use expensive optical filters. In one example, the phase plate 200 can be used in applications involving imaging fluorescent molecules. The point spread function engineered profile 210 of the phase plate 200 can distinguish between two different types of fluorescing molecules without using a polarization dependent spatial light modulator, which requires another device that uses a fixed polarization of the detected light, and without using electromagnetic band-pass filters. The phase plate 200 can also be produced to be flat and compact to incorporate into existing optical systems.

The phase plate 200 can be used in other applications, such as in the construction of a portable, flat spectrometer. The spectrometer can be mounted to the camera of a smartphone with the phase plate 200 mounted behind a pinhole. The pinhole acts as a point source and light entering through it falls onto the camera of a smart phone after passing through the phase plate 200. The spectral information of the light coming through the pin hole can then be collected at the sensor as a geometric form of the point-spread function created by the pinhole.

The following description section exemplifies several square grid profiles which can be used to extract position and wavelength of a point emitter. These particular phase plates assume an arbitrary index of refraction of 1.5, though this number can vary depending on the particular materials chosen for the phase plate. In each case, FIG. # E shows the theoretically minimal statistical uncertainty associated with extracting x, y, z, and λ from an optical signal, which is inherently distorted with detection noise (the detection statistics of light follow the Poisson distribution). This inherent noise is what causes this uncertainty to be greater than zero. This minimal uncertainty is called the "Cramer-Rao lower bound (CRLB). All length units are in micrometers (e.g. 0.561 μm=561 nm). FIG. # B each shows the phase plate design with the color bar indicating the thickness of the plate in micrometers. FIG. # D each shows the produced point-spread functions at the center of the field of view and at the focus (i.e. the axial position of the emitter is zero). The wavelength in micrometers at which each point-spread function was calculated is shown above each rendering. Generally, these examples illustrate, among other aspects, that increasing the thickness of a phase plate increases the frequency with which the point-spread function, and therefore the wavelength precision, cycles through its different possible shapes as a function of wavelength.

Figure 3A:
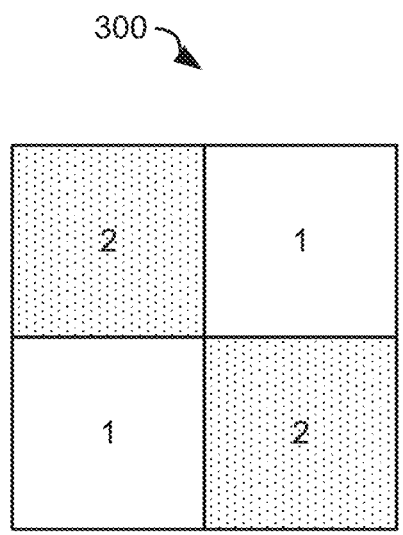
FIG. 3A is a diagram of a point spread function (PSF) engineered profile having four regions at two different tiers for a phase plate for high precision wavelength extraction according to one aspect of the present invention.

FIG. 3A is a diagram of a point spread function (PSF) engineered profile 300 having four regions at two different tier heights for a phase plate for high precision wavelength extraction according to one aspect of the present invention. The first tier region, denoted by the number 1, can include two regions of a top surface of the phase plate. The second tier region, denoted by the number 2, can include two regions of the top surface of the phase plate having a different thickness relative to the first tier region. The first and second tier regions can alternate regions about a central axis or other location to form a checkerboard pattern.

Figure 3B:
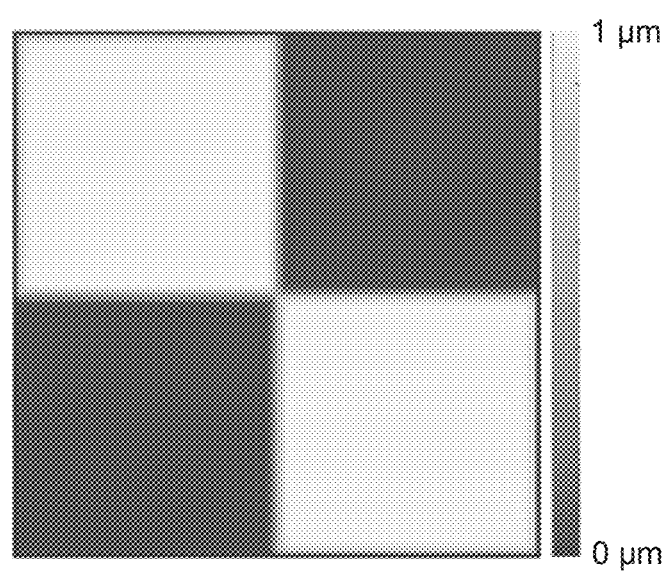
FIG. 3B is a height-map diagram of the PSF engineered profile of FIG. 3A having four regions at two different tiers according to one aspect of the present invention.

FIG. 3B is a height-map diagram of the PSF engineered profile 300 of FIG. 3A having four regions at two different tiers according to one aspect of the present invention. The first tier region (denoted by the darker color) and the second tier region (denoted by the lighter color) can have a relative thickness of one (1) micrometer as indicated by the color scale gradient between 0 and 1 micrometers. The second tier region can be formed by adding up to 1 micrometer of material to one or more locations of the top surface of the phase plate. In another example, the first tier region can be formed by removing up to 1 micrometer of material to one or more locations of the top surface of the phase plate. Other combinations of adding to or removing material from the top surface of the phase plate can provide the relative different thicknesses between the first and second tier regions.

The relative thickness between the two tier regions can be selected according to a wavelength of light. For example, assuming 90 degrees incidence, the relative thickness can be $2\pi$ (e.g. full period of light). In another example, the relative thickness can be less than $\pi$.

Figure 3C:
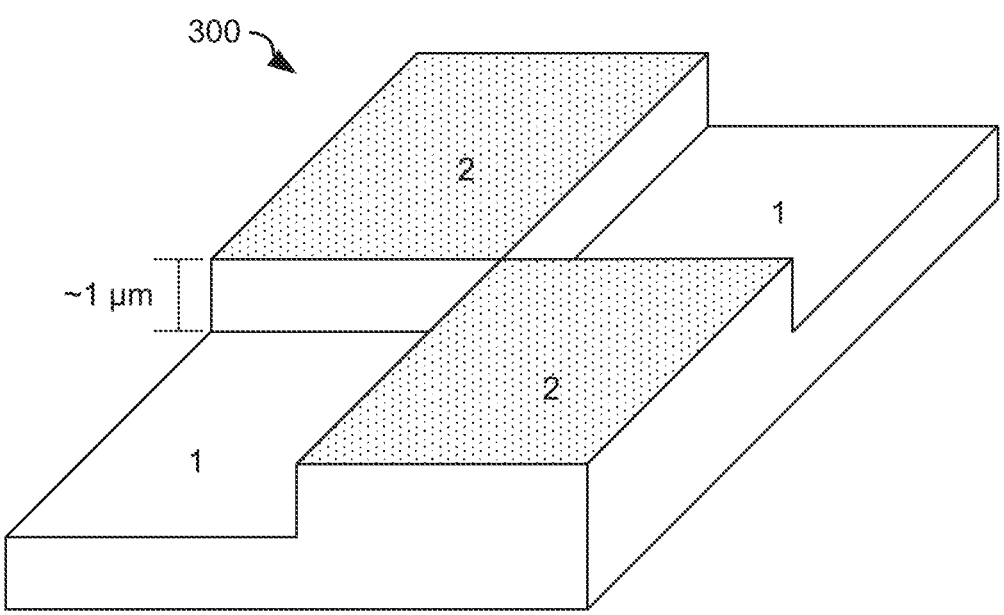
FIG. 3C is a perspective view of the PSF engineered profile of FIG. 3A having four regions at two different tiers according to one aspect of the present invention.

FIG. 3C is a perspective view of the PSF engineered profile 300 of FIG. 3A having four regions at two different tiers according to one embodiment of the present invention. As illustrated, the first tier region can be found at a first level of the top surface of the phase plate. The second tier region can be found at a second level of the top surface of the phase plate, approximately one (1) micrometer above the first tier region.

Figure 3D:
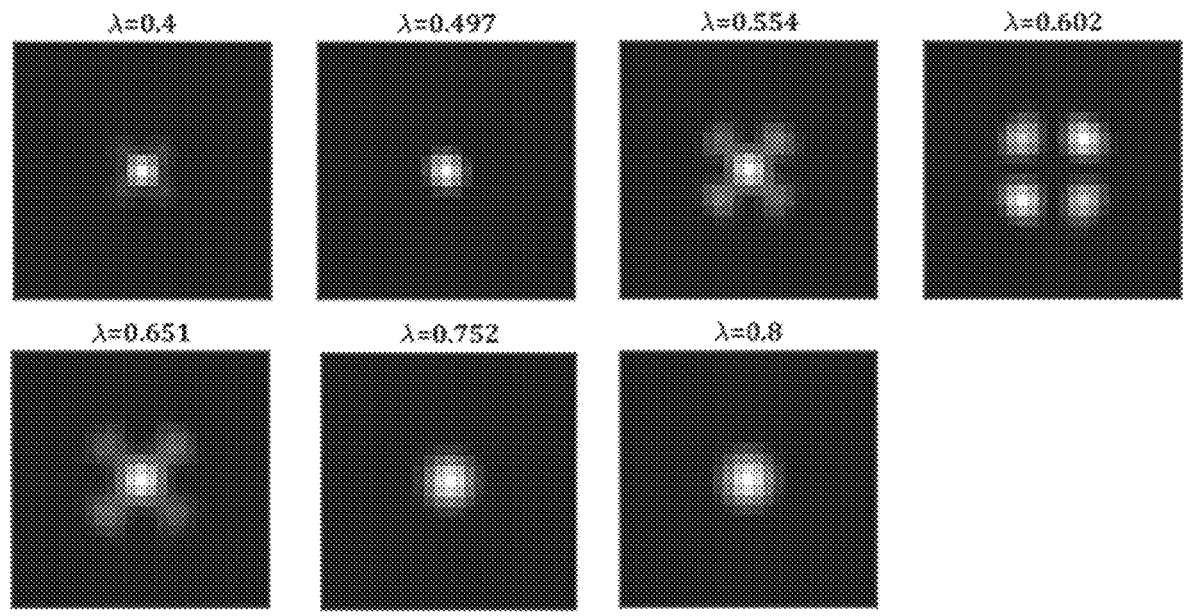
FIG. 3D is an illustration of wavelength dependent geometric patterns for the PSF engineered profile of FIG. 3A having four regions at two different tiers.

FIG. 3D is an illustration of wavelength dependent geometric patterns for the PSF engineered profile 300 of FIG. 3A having four regions at two different tiers according to one embodiment of the present invention. The PSF engineered profile 300 produces a distinctive color-to-shape mapping. As illustrated, the PSF engineered profile 300 creates a shape of a "clover leaf" with this particular profile. The PSF engineered profile 300 can produce a pattern that is radially symmetric about a central axis. The pattern can also remain roughly the same shape regardless of the numerical aperture of the microscope.

Figure 3E:
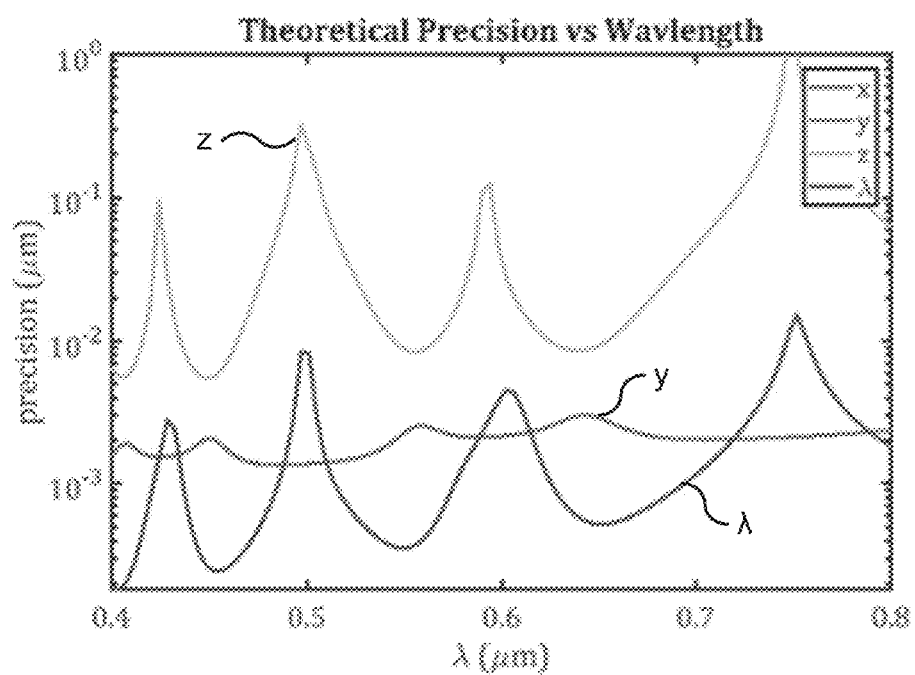
FIG. 3E is a graph illustrating the theoretically minimal statistical uncertainty associated with extracting x, y, z, and $\lambda$ from an optical signal using the PSF engineered profile of FIG. 3A having four regions at two different tiers.

FIG. 3E is a graph illustrating the theoretically minimal statistical uncertainty associated with extracting x, y, z, and $\lambda$ from an optical signal using the PSF engineered profile of FIG. 3A having four regions at two different tiers according to one aspect of the present invention.

Figure 4A:
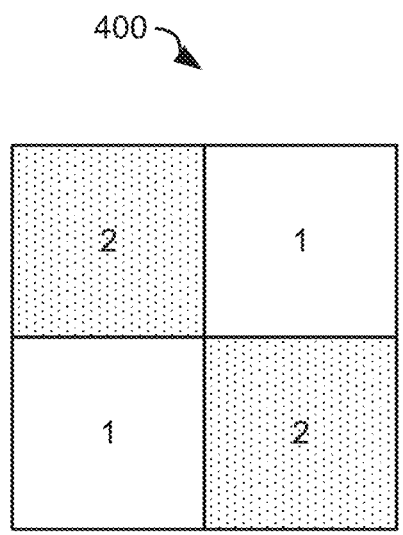
FIG. 4A is a diagram of an PSF engineered profile on a substrate having four regions at two different tiers for a phase plate for high precision wavelength extraction according to one aspect of the present invention.

FIG. 4A is a diagram of an PSF engineered profile 400 on a substrate having four regions (4×4 grid) at two different tier heights for a phase plate for high precision wavelength extraction. The first tier region, denoted by the number 1, can include two regions of a top surface of the phase plate. The second tier region, denoted by the number 2, can include two regions of the top surface of the phase plate having a different thickness relative to the first tier region. The first and second tier regions can alternate regions about a central axis or other location to form a checkerboard pattern.

Figure 4B:
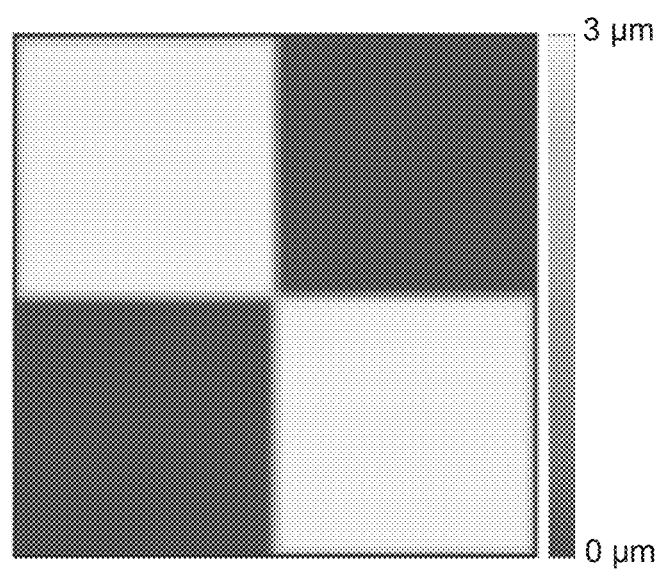
FIG. 4B is a height-map diagram of the PSF engineered profile of FIG. 4A having four regions at two different tiers according to one aspect of the present invention.

FIG. 4B is a height-map diagram of the PSF engineered profile of FIG. 4A having four regions at two different tiers according to one embodiment of the present invention. The first tier region (denoted by the darker color) and the second tier region (denoted by the lighter color) can have a relative thickness of three (3) micrometers as indicated by the color scale gradient between 0 and 3 micrometers. The second tier region can be formed by adding up to 3 micrometers of material to one or more locations of the top surface of the phase plate. In another example, the first tier region can be formed by removing up to 3 micrometers of material to one or more locations of the top surface of the phase plate. Other combinations of adding to or removing material from the top surface of the phase plate can provide the relative different thicknesses between the first and second tier regions.

Figure 4C:
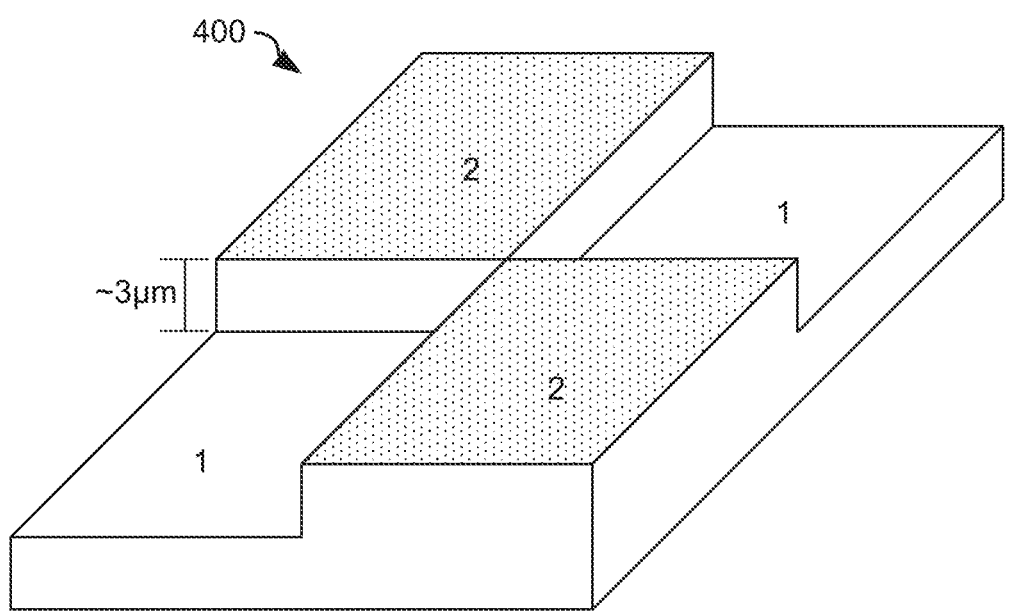
FIG. 4C is a perspective view of the PSF engineered profile of FIG. 4A having four regions at two different tiers.

FIG. 4C is a perspective view of the PSF engineered profile of FIG. 4A having four regions at two different tiers. As illustrated, the first tier region can be found at a first level of the top surface of the phase plate. The second tier region can be found at a second level of the top surface of the phase plate, approximately three (3) micrometers above the first tier region.

Figure 4D:
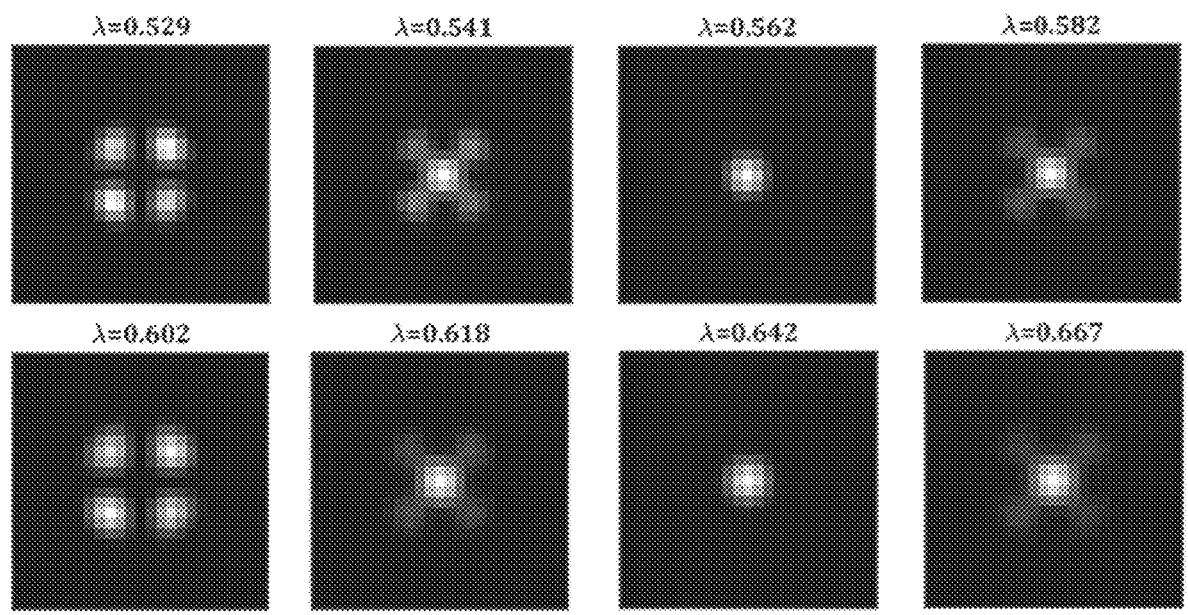
FIG. 4D is an illustration of wavelength dependent geometric patterns for the PSF engineered profile of FIG. 4A having four regions at two different tiers.

FIG. 4D is an illustration of wavelength dependent geometric patterns produced by the PSF engineered profile 400 of FIG. 4A having four regions at two different tiers. The PSF engineered profile 400 produces a distinctive color-to-shape mapping. As illustrated, the PSF engineered profile 300 can produce a pattern that is radially symmetric about a central axis. The pattern can remain roughly the same shape regardless of the numerical aperture of the microscope. In this example, increasing the relative thickness between the two tier regions increases the frequency with which the point-spread function, and therefore the wavelength precision, cycles through its different possible shapes.

Figure 4E:
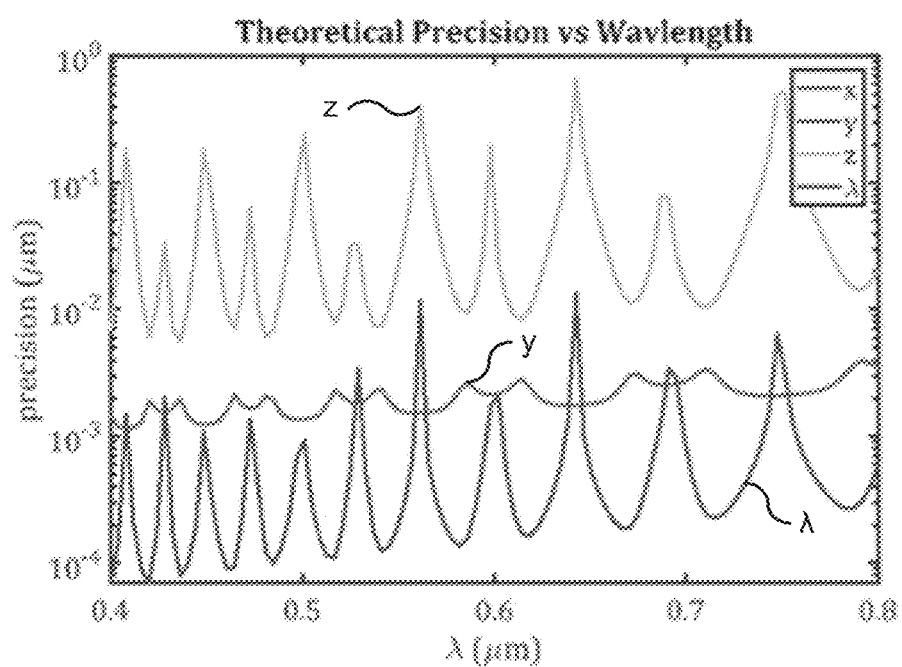
FIG. 4E is a graph illustrating the theoretically minimal statistical uncertainty associated with extracting x, y, z, and $\lambda$ from an optical signal using the PSF engineered profile of FIG. 4A having four regions at two different tiers.

FIG. 4E is a graph illustrating the theoretically minimal statistical uncertainty associated with extracting x, y, z, and $\lambda$ from an optical signal using the PSF engineered profile of FIG. 4A having four regions at two different tiers. This graphs shows that each of positions x, y and z, as well as wavelength can be determined. The localization precision varies depending on wavelength and increasing the thickness of the thicker region for a binary grid design cases the PSF to cycle through shapes more rapidly. As a general guideline, wavelengths can be extracted via this approach with a resolution or discrimination of less than about 10 nm, and often less than 1 nm.

Figure 5A:
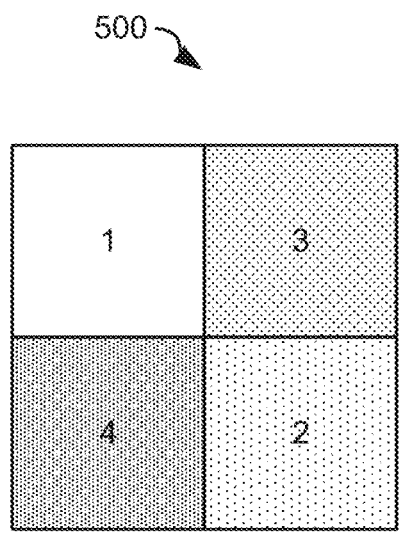
FIG. 5A is a diagram of an PSF engineered profile on a substrate having four regions at four different tiers for a phase plate for high precision wavelength extraction according to one aspect of the present invention.

FIG. 5A is a diagram of a PSF engineered profile 500 on a substrate having four regions (4×4 grid) at four different tier heights for a phase plate for high precision wavelength extraction. The first tier region, denoted by the number 1, can include one region of a top surface of the phase plate. The second tier region, denoted by the number 2, can include one region of the top surface of the phase plate having a different thickness relative to the first tier region. The third tier region, denoted by the number 3, can include one region of the top surface of the phase plate having a different thickness relative to the second tier region. The forth tier region, denoted by the number 4, can include one region of the top surface of the phase plate having a different thickness relative to the third tier region. The first, second, third, and fourth tier regions can alternate regions about a central axis or other location to form a checkerboard pattern.

Figure 5B:
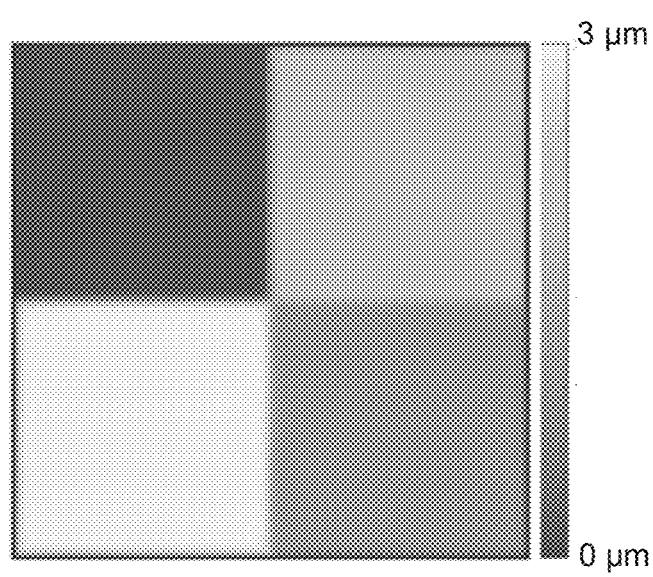
FIG. 5B is a height-map diagram of the PSF engineered profile of FIG. 5A having four regions at four different tiers according to one aspect of the present invention.

FIG. 5B is a height-map diagram of the PSF engineered profile of FIG. 5A having four regions at four different tiers. The first tier region (denoted by the darkest color) and the fourth tier region (denoted by the lightest color) can have a relative thickness of three (3) micrometers as indicated by the color scale gradient between 0 and 3 micrometers. The second tier region can be relatively thicker than the first tier region and less than the third tier region. The third tier region can be relatively thicker than the second tier region and less than the fourth tier region.

Figure 5C:
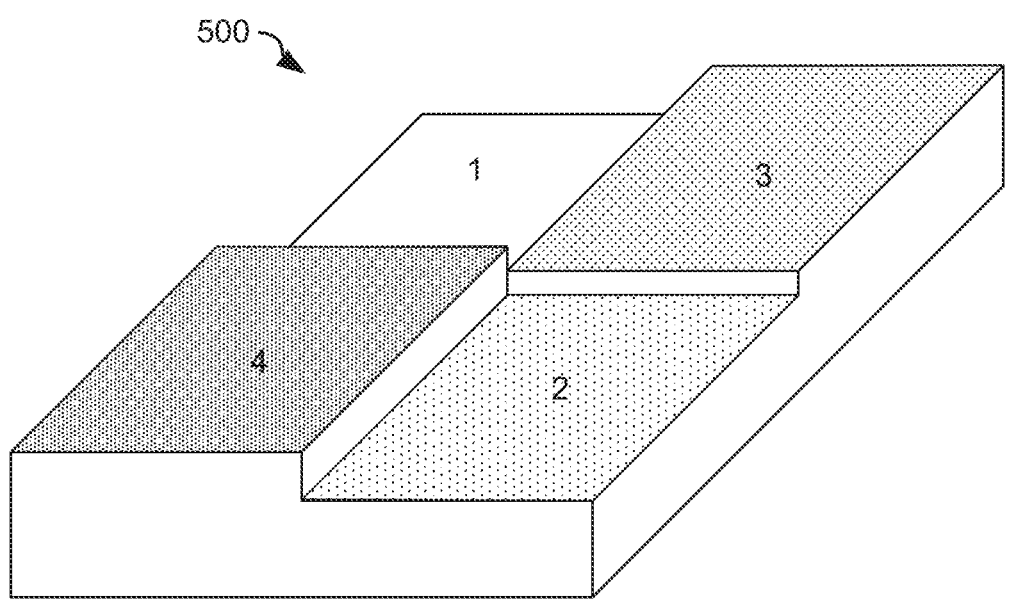
FIG. 5C is a perspective view of the PSF engineered profile of FIG. 5A having four regions at four different tiers.

FIG. 5C is a perspective view of the PSF engineered profile of FIG. 5A having four regions at four different tiers according to one embodiment of the present invention. As illustrated, the first tier region can be found at a first level of the top surface of the phase plate. The second tier region can be found at a second level of the top surface of the phase plate, approximately one (1) micrometer above the first tier region. The third tier region can be found at a third level of the top surface of the phase plate, approximately one (1) micrometer above the second tier region and two (2) micrometers above the first tier region. The fourth tier region can be found at a fourth level of the top surface of the phase plate, approximately one (1) micrometer above the third tier region, two (2) micrometers above the second tier region, and one (1) micrometer above the third tier region.

Figure 5D:
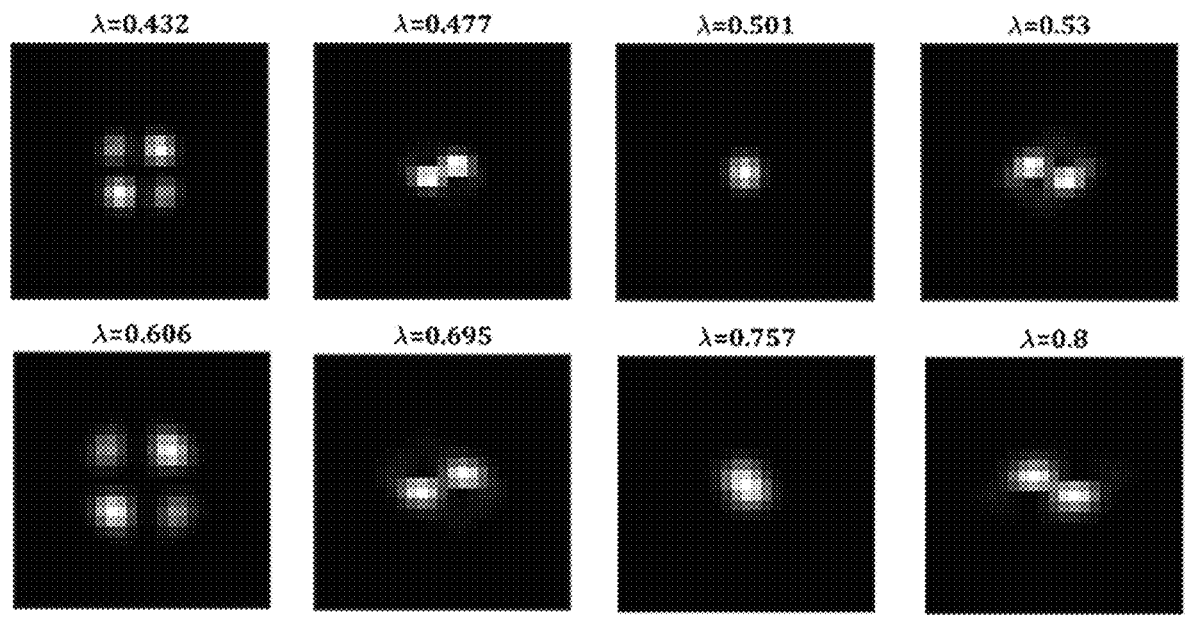
FIG. 5D is an illustration of wavelength dependent geometric patterns for the PSF engineered profile of FIG. 5A having four regions at four different tiers.

FIG. 5D is an illustration of wavelength dependent geometric patterns produced by the PSF engineered profile 500 of FIG. 5A having four regions at four different tiers. The PSF engineered profile 500 produces a distinctive color-to-shape mapping. As illustrated, the PSF engineered profile 500 can produce a pattern that is radially symmetric about a central axis. The pattern can remain roughly the same shape regardless of the numerical aperture of the microscope.

Figure 5E:
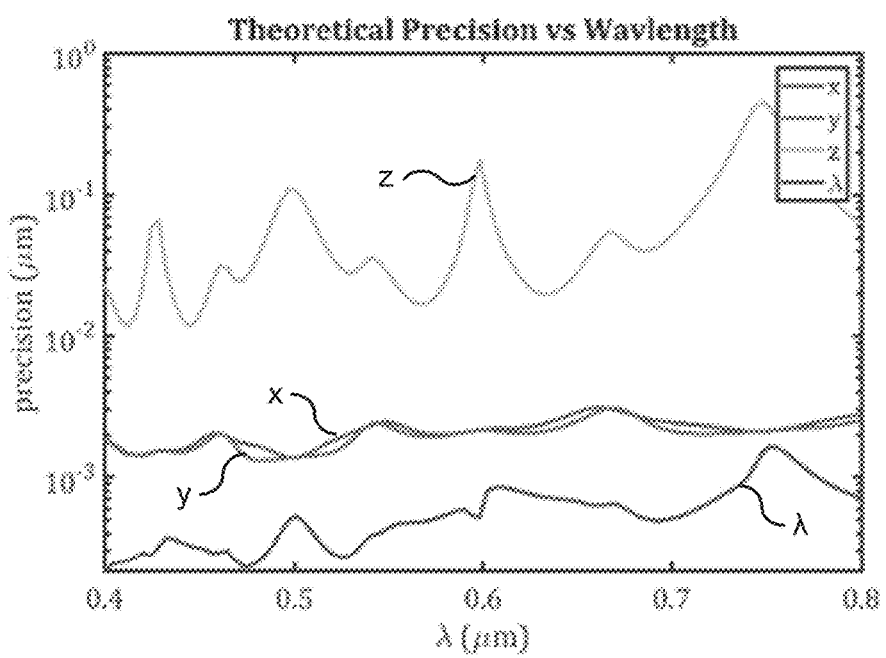
FIG. 5E is a graph illustrating the theoretically minimal statistical uncertainty associated with extracting x, y, z, and $\lambda$ from an optical signal using the PSF engineered profile of FIG. 5A having four regions at four different tiers.

FIG. 5E is a graph illustrating the theoretically minimal statistical uncertainty associated with extracting x, y, z, and λ from an optical signal using the PSF engineered profile of FIG. 5A having four regions at four different tiers.

Figure 6A:
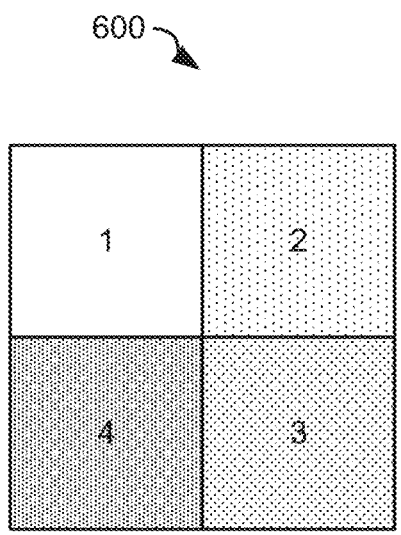
FIG. 6A is a diagram of an PSF engineered profile on a substrate having four regions at four different tiers for a phase plate for high precision wavelength extraction according to one aspect of the present invention.

FIG. 6A is a diagram of an PSF engineered profile 600 on a substrate having four regions in a 4×4 grid at four different tier heights for a phase plate for high precision wavelength extraction. The first tier region, denoted by the number 1, can include one region of a top surface of the phase plate. The second tier region, denoted by the number 2, can include one region of the top surface of the phase plate having a different thickness relative to the first tier region. The third tier region, denoted by the number 3, can include one region of the top surface of the phase plate having a different thickness relative to the second tier region. The forth tier region, denoted by the number 4, can include one region of the top surface of the phase plate having a different thickness relative to the third tier region. The first, second, third, and fourth tier regions can alternate regions about a central axis or other location to form a checkerboard pattern.

Figure 6B:
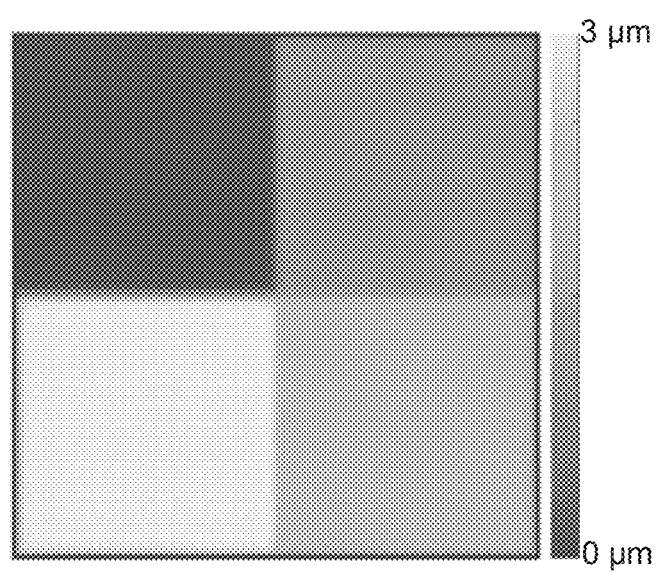
FIG. 6B is a height-map diagram of the PSF engineered profile of FIG. 6A having four regions at four different tiers according to one aspect of the present invention.

FIG. 6B is a height-map diagram of the PSF engineered profile of FIG. 6A having four regions at four different tiers. The first tier region (denoted by the darkest color) and the fourth tier region (denoted by the lightest color) can have a relative thickness of three (3) micrometers as indicated by the color scale gradient between 0 and 3 micrometers. The second tier region can be relatively thicker than the first tier region and less than the third tier region. The third tier region can be relatively thicker than the second tier region and less than the fourth tier region.

Figure 6C:
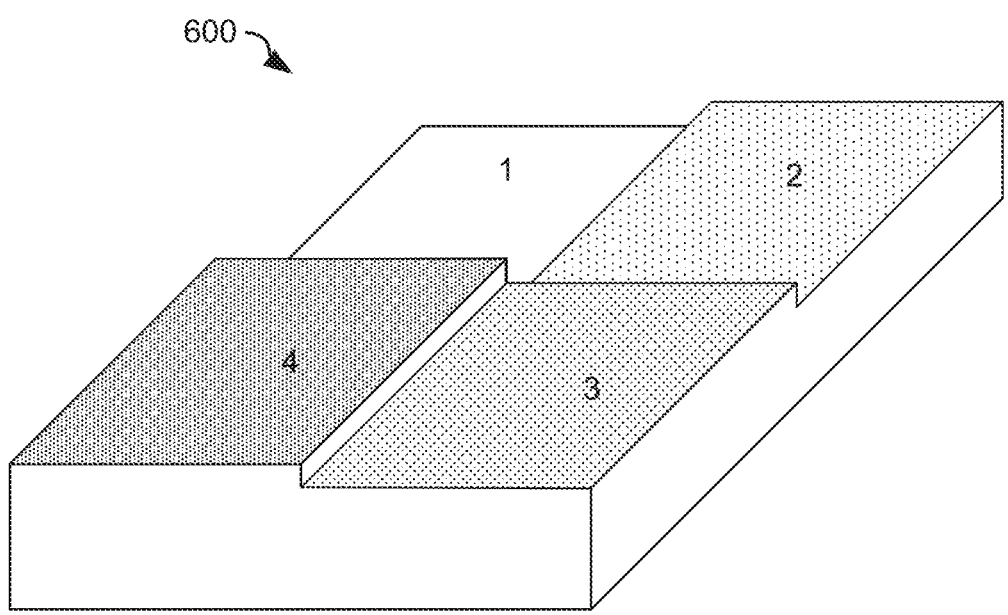
FIG. 6C is a perspective view of the PSF engineered profile of FIG. 6A having four regions at four different tiers.

FIG. 6C is a perspective view of the PSF engineered profile of FIG. 6A having four regions at four different tiers. As illustrated, the first tier region can be found at a first level of the top surface of the phase plate. The second tier region can be found at a second level of the top surface of the phase plate, approximately one (1) micrometer above the first tier region. The third tier region can be found at a third level of the top surface of the phase plate, approximately one (1) micrometer above the second tier region and two (2) micrometers above the first tier region. The fourth tier region can be found at a fourth level of the top surface of the phase plate, approximately one (1) micrometer above the third tier region, two (2) micrometers above the second tier region, and one (1) micrometer above the third tier region.

Figure 6D:
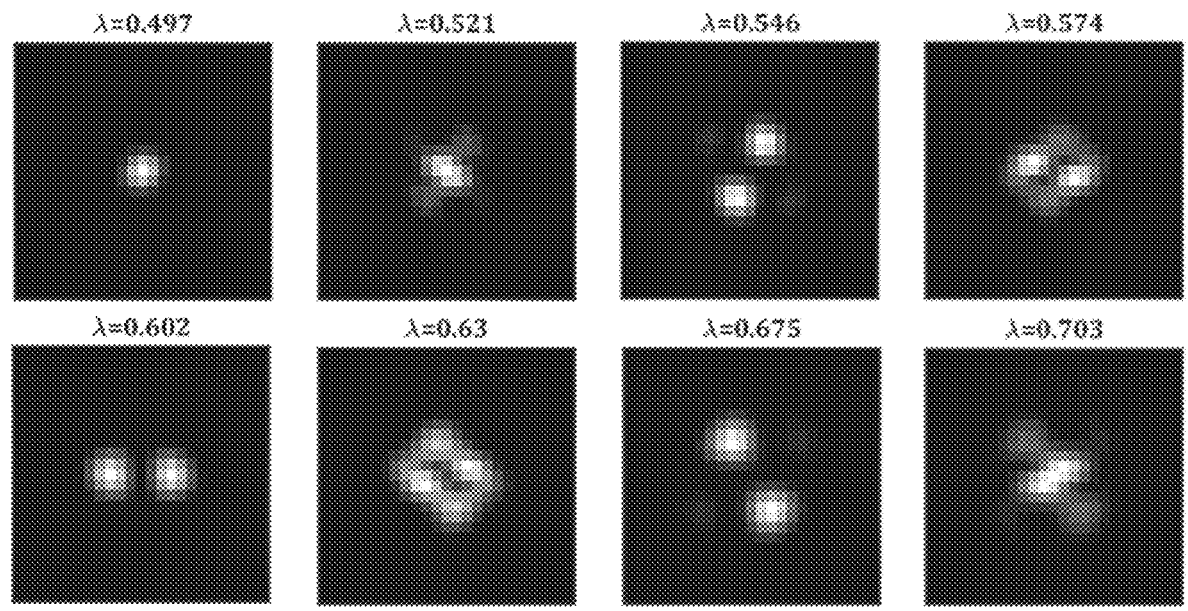
FIG. 6D is an illustration of wavelength dependent geometric patterns for the PSF engineered profile of FIG. 6A having four regions at four different tiers.

FIG. 6D is an illustration of wavelength dependent geometric patterns produced by the PSF engineered profile 600 of FIG. 6A having four regions at four different tiers. The PSF engineered profile 600 produces a distinctive color-to-shape mapping. As illustrated, the PSF engineered profile 600 can produce a pattern that is radially symmetric about a central axis. The pattern can remain the same size regardless of the size of a light spot. This illustration also shows the PSF rotating with change in wavelength. This is distinct from a double-helix point spread function in that the double helix point-spread function rotates when the axial position (z positions) of the emitter changes with respect to the focus.

Figure 6E:
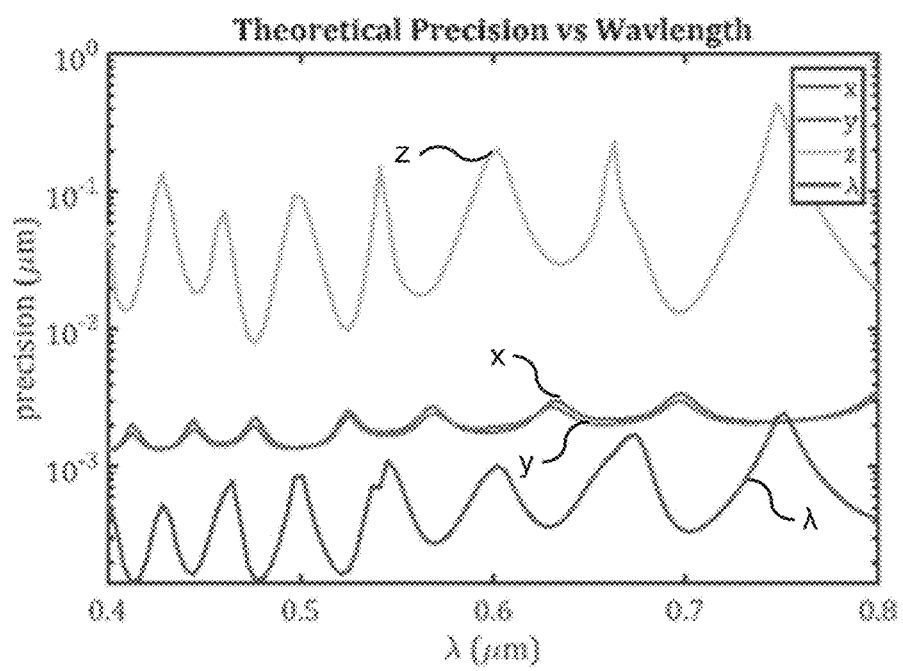
FIG. 6E is a graph illustrating the theoretically minimal statistical uncertainty associated with extracting x, y, z, and λ from an optical signal using the PSF engineered profile of FIG. 6A having four regions at four different tiers.

FIG. 6E is a graph illustrating the theoretically minimal statistical uncertainty associated with extracting x, y, z, and λ from an optical signal using the PSF engineered profile of FIG. 6A having four regions at four different tiers.

Figure 7A:
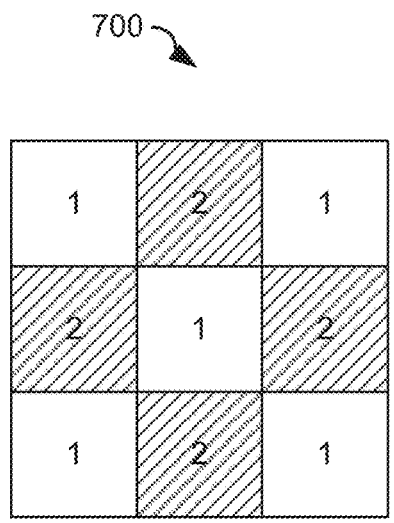
FIG. 7A is a diagram of an PSF engineered profile on a substrate having nine regions at two different tiers for a phase plate for high precision wavelength extraction according to one aspect of the present invention.

FIG. 7A is a diagram of an PSF engineered profile 700 on a substrate having nine regions in a 3×3 grid at two different tier heights for a phase plate for high precision wavelength extraction. The first tier region, denoted by the number 1, can include one or more regions of a top surface of the phase plate. In this example, the first tier region includes 5 regions of the top surface of the phase plate. The second tier region, denoted by the number 2, can include one or more regions of the top surface of the phase plate having a different thickness relative to the first tier region. In this example, the second tier region includes 4 regions of the top surface of the phase plate. The first and second tier regions can form a checkerboard pattern.

Figure 7B:
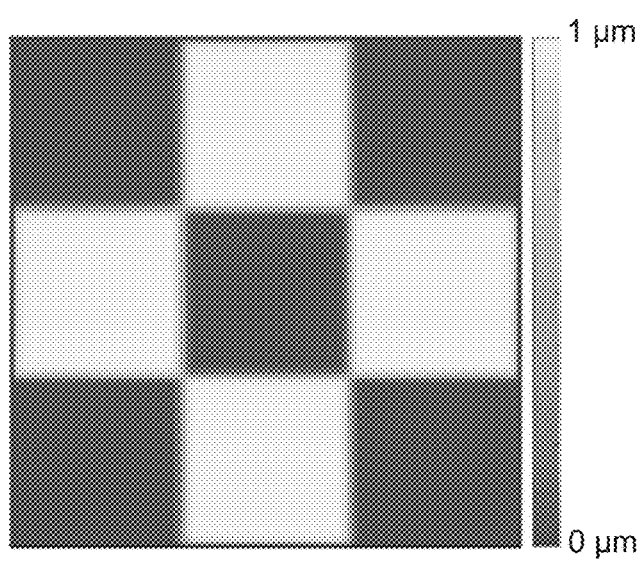
FIG. 7B is a height-map diagram of the PSF engineered profile of FIG. 7A having nine regions at two different tiers according to one aspect of the present invention.

FIG. 7B is a height-map diagram of the PSF engineered profile of FIG. 7A having nine regions at two different tier heights. The first tier region (denoted by the darker color) and the second tier region (denoted by the lighter color) can have a relative thickness of one (1) micrometer as indicated by the color scale gradient between 0 and 1 micrometers. The second tier region can be formed by adding up to 1 micrometer of material to one or more locations of the top surface of the phase plate. In another example, the first tier region can be formed by removing up to 1 micrometer of material to one or more locations of the top surface of the phase plate. Other combinations of adding to or removing material from the top surface of the phase plate can provide the relative different thicknesses between the first and second tier regions.

Figure 7C:
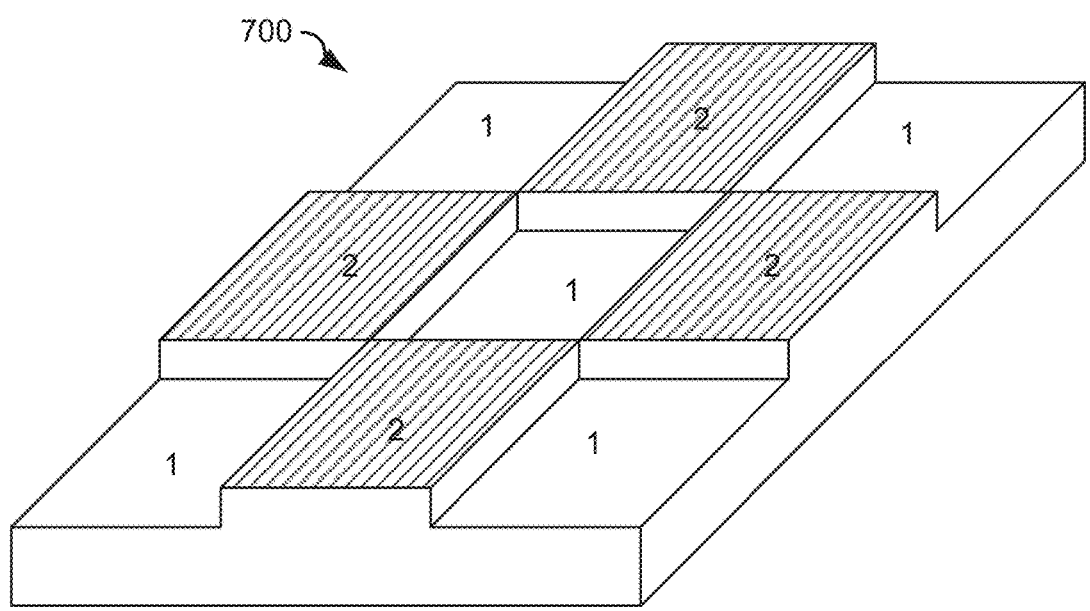
FIG. 7C is a perspective view of the PSF engineered profile of FIG. 7A having nine regions at two different tiers.

FIG. 7C is a perspective view of the PSF engineered profile of FIG. 7A having nine regions at two different tiers. As illustrated, the first tier region can be found at a first level of the top surface of the phase plate. The second tier region can be found at a second level of the top surface of the phase plate, approximately one (1) micrometer above the first tier region.

Figure 7D:
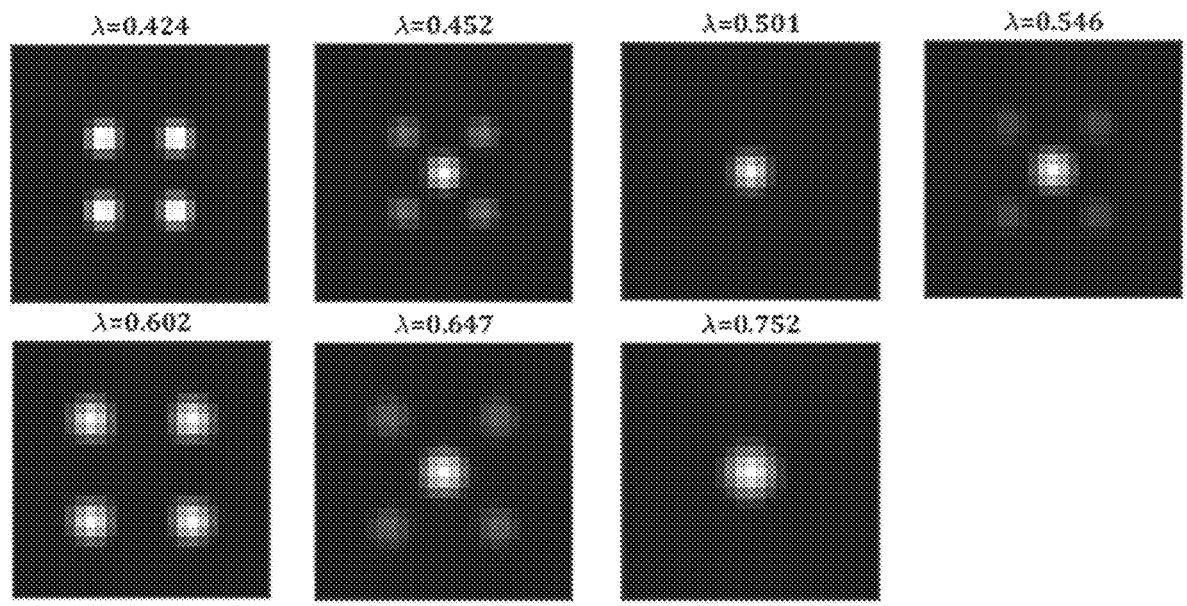
FIG. 7D is an illustration of wavelength dependent geometric patterns for the PSF engineered profile of FIG. 7A having nine regions at two different tiers.

FIG. 7D is an illustration of wavelength dependent geometric patterns for the PSF engineered profile 700 of FIG. 7A having nine regions at two different tiers. The PSF engineered profile 700 produces a distinctive color-to-shape mapping. As illustrated, the PSF engineered profile 700 creates a shape of a "clover leaf" for specific wavelengths. The PSF engineered profile 700 can also produce a geometric pattern that is radially symmetric about a central axis. Insensitivity to numerical aperture is not exhibited in this configuration as with other configurations (e.g. four regions patterns described earlier).

Figure 7E:
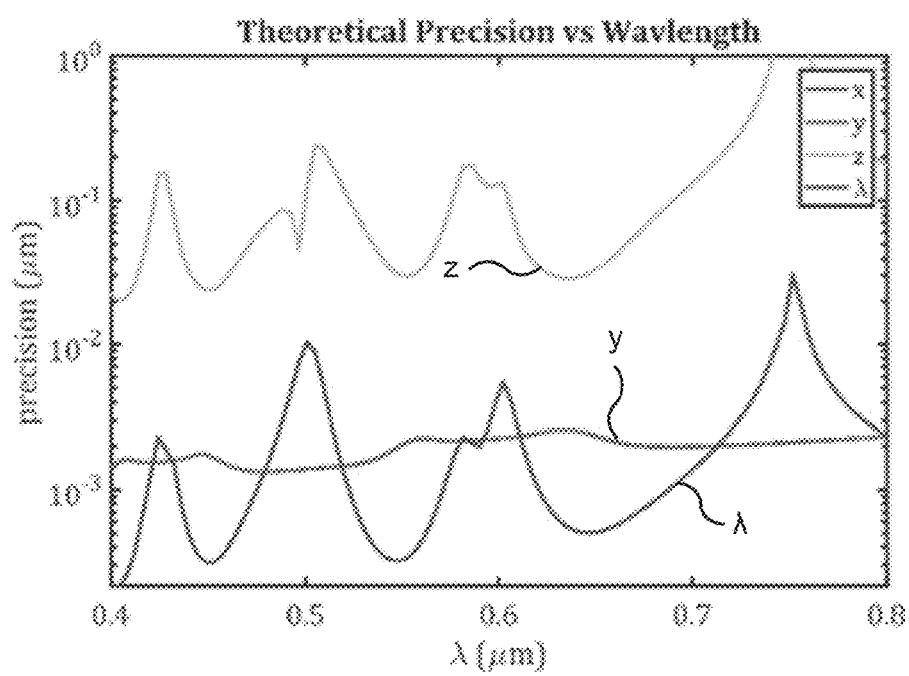
FIG. 7E is a graph illustrating the theoretically minimal statistical uncertainty associated with extracting x, y, z, and λ from an optical signal using the PSF engineered profile of FIG. 7A having nine regions at two different tiers.

FIG. 7E is a graph illustrating the theoretically minimal statistical uncertainty associated with extracting x, y, z, and λ from an optical signal using the PSF engineered profile of FIG. 7A having nine regions at two different tiers.

Figure 8A:
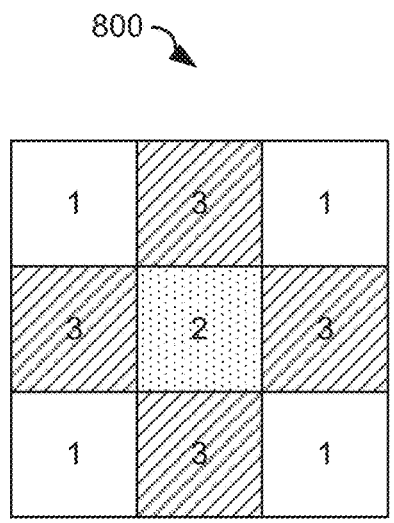
FIG. 8A is a diagram of an PSF engineered profile on a substrate having nine regions at three different tiers for a phase plate for high precision wavelength extraction according to one aspect of the present invention.

FIG. 8A is a diagram of an PSF engineered profile 800 on a substrate having nine regions in a 3×3 grid at three different tier heights for a phase plate for high precision wavelength extraction. The first tier region, denoted by the number 1, can include one or more regions of a top surface of the phase plate. In this example, the first tier region includes 4 regions of the top surface of the phase plate. The second tier region, denoted by the number 2, can include one or more regions of the top surface of the phase plate having a different thickness relative to the first tier region. In this example, the second tier region includes 1 region of the top surface of the phase plate. The third tier region, denoted by the number 3, can include one or more regions of the top surface of the phase plate having a different thickness relative to the first and second tier regions. In this example, the third tier region includes 4 regions of the top surface of the phase plate. The first, second, and third tier regions can form a checkerboard pattern with the second tier region in the center.

Figure 8B:
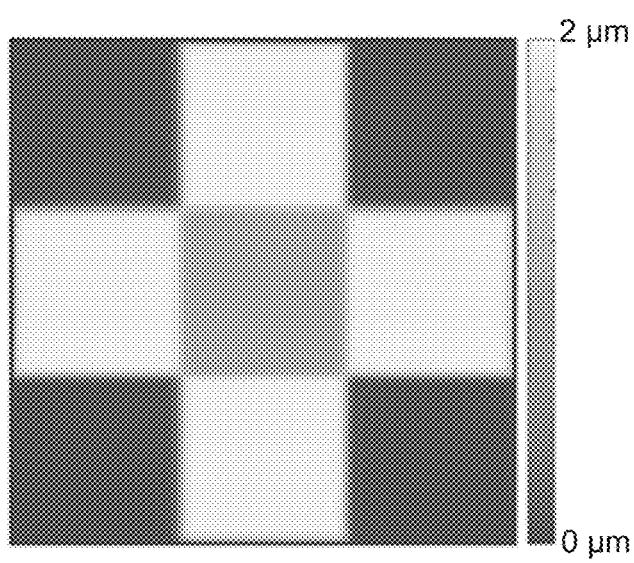
FIG. 8B is a height-map diagram of the PSF engineered profile of FIG. 8A having nine regions at three different tiers according to one aspect of the present invention.

FIG. 8B is a height-map diagram of the PSF engineered profile of FIG. 8A having nine regions at three different tier heights. The first tier region (denoted by the darkest color) and the third tier region (denoted by the lightest color) can have a relative thickness of two (2) micrometers as indicated by the color scale gradient between 0 and 2 micrometers. The second tier region can be formed by adding approximately 1 micrometer of material to one or more locations of the top surface of the phase plate or by removing material from a thicker initial substrate.

Figure 8C:
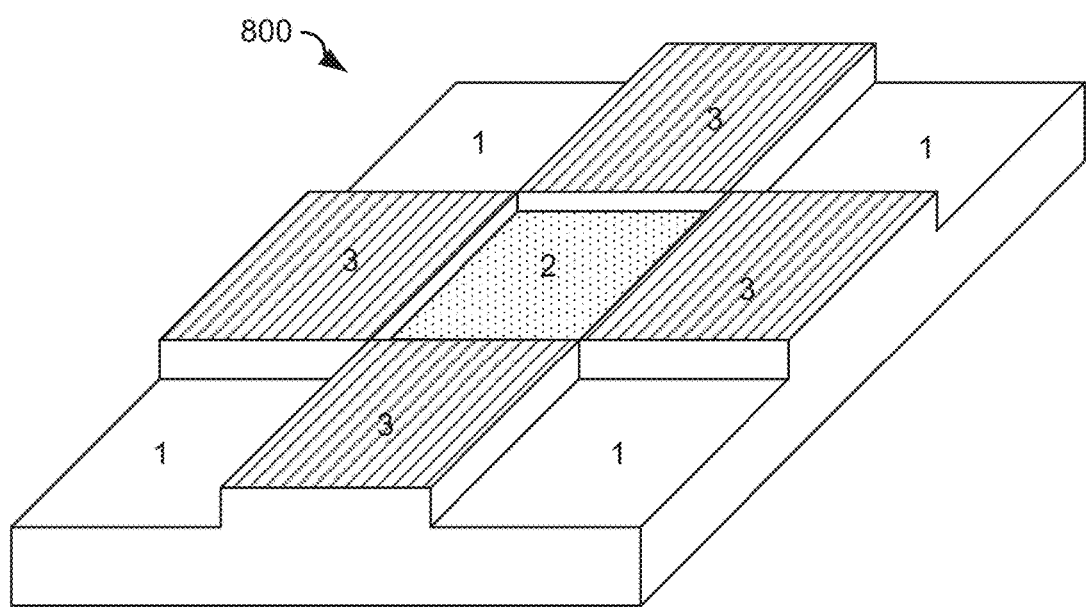
FIG. 8C is a perspective view of the PSF engineered profile of FIG. 8A having nine regions at three different tiers.

FIG. 8C is a perspective view of the PSF engineered profile of FIG. 8A having nine regions at three different tiers. As illustrated, the first tier region can be found at a first level of the top surface of the phase plate. The second tier region can be found at a second level of the top surface of the phase plate, approximately one (1) micrometer above the first tier region. The third tier region can be found at a third level of the top surface of the phase plate, approximately one (1) micrometer above the second tier region and approximately two (2) micrometers above the first tier region.

Figure 8D:
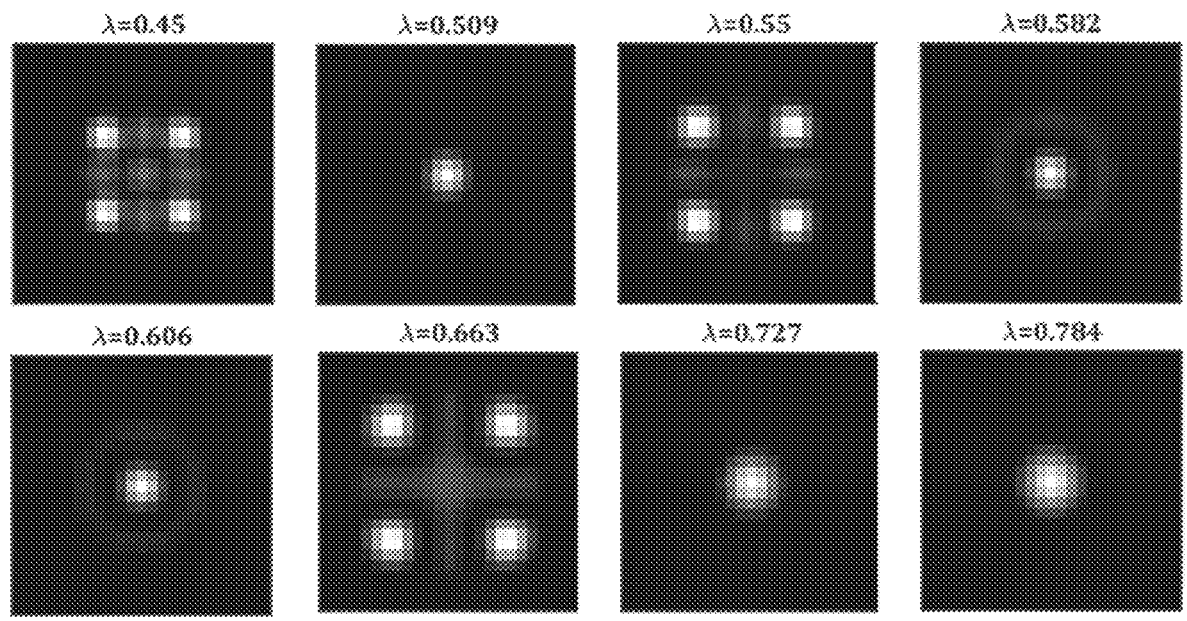
FIG. 8D is an illustration of wavelength dependent geometric patterns for the PSF engineered profile of FIG. 8A having nine regions at three different tiers.

FIG. 8D is an illustration of wavelength dependent geometric patterns for the PSF engineered profile 800 of FIG. 8A having nine regions at three different tier heights. The PSF engineered profile 800 produces a distinctive color-to-shape mapping. As illustrated, the PSF engineered profile 800 creates a shape of a "clover leaf" for certain wavelengths of incoming light. The PSF engineered profile 800 can produce a geometric pattern that is radially symmetric about a central axis.

Figure 8E:
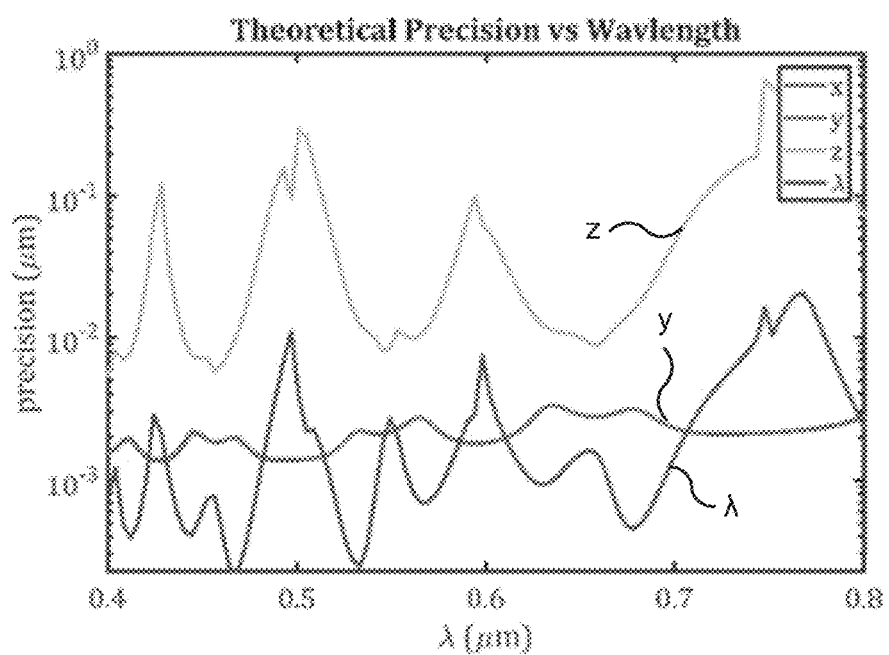
FIG. 8E is a graph illustrating the theoretically minimal statistical uncertainty associated with extracting x, y, z, and λ from an optical signal using the PSF engineered profile of FIG. 8A having nine regions at three different tiers.

FIG. 8E is a graph illustrating the theoretically minimal statistical uncertainty associated with extracting x, y, z, and λ from an optical signal using the PSF engineered profile of FIG. 8A having nine regions at three different tiers according to one embodiment of the present invention.

Figure 9A:
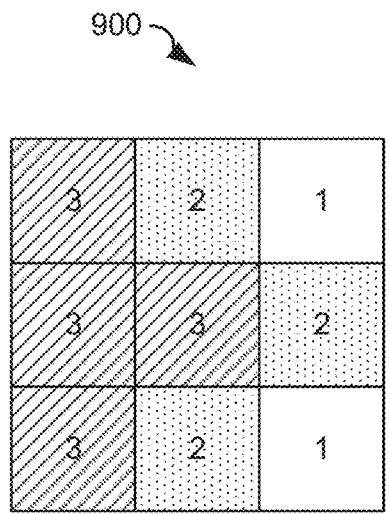
FIG. 9A is a diagram of an PSF engineered profile on a substrate having nine regions at three different tiers for a phase plate for high precision wavelength extraction according to yet another aspect of the present invention.

FIG. 9A is a diagram of an PSF engineered profile on a substrate having nine regions in a 3×3 grid at three different tier heights for a phase plate for high precision wavelength extraction. The first tier region, denoted by the number 1, can include one region of a top surface of the phase plate. The second tier region, denoted by the number 2, can include one region of the top surface of the phase plate having a different thickness relative to the first tier region. The third tier region, denoted by the number 3, can include one region of the top surface of the phase plate having a different thickness relative to the second tier region. The first, second, third, and fourth tier regions can be arranged to form a stepped pattern.

Figure 9B:
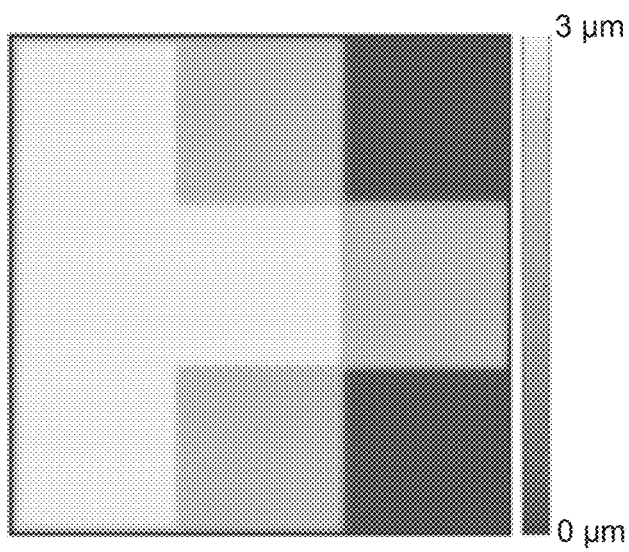
FIG. 9B is a height-map diagram of the PSF engineered profile of FIG. 9A having nine regions at three different tiers according to one aspect of the present invention.

FIG. 9B is a height-map diagram of the PSF engineered profile of FIG. 9A having nine regions at three different tier heights. The first tier region (denoted by the darkest color) and the third tier region (denoted by the lightest color) can have a relative thickness of three (3) micrometers as indicated by the color scale gradient between 0 and 3 micrometers. The second tier region can be relatively thicker than the first tier region and less than the third tier region.

Figure 9C:
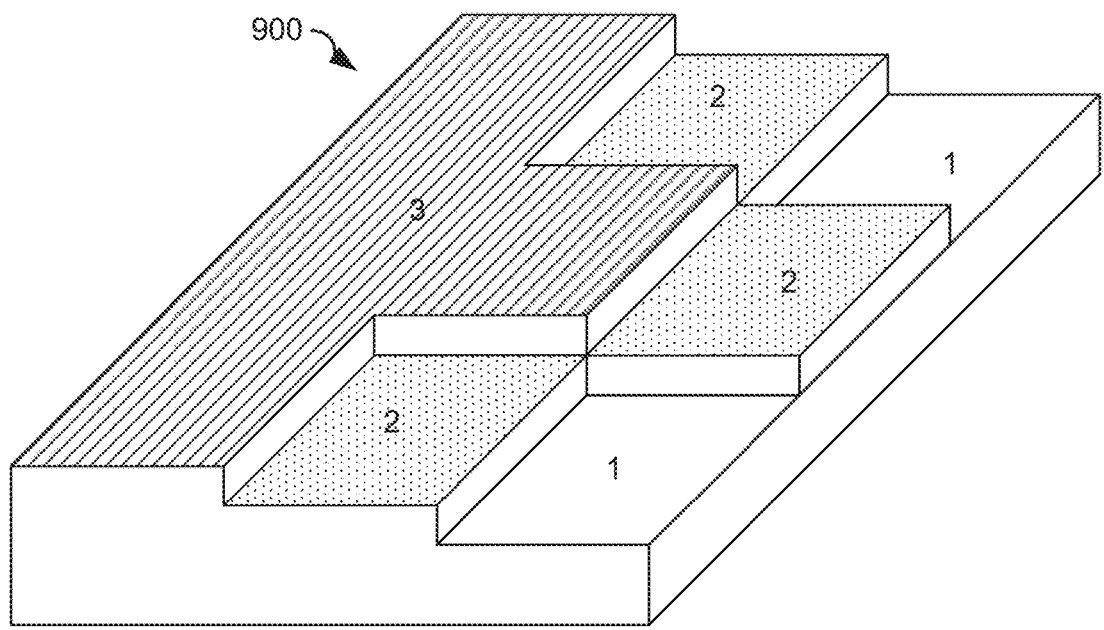
FIG. 9C is a perspective view of the PSF engineered profile of FIG. 9A having nine regions at three different tiers.

FIG. 9C is a perspective view of the PSF engineered profile of FIG. 9A having nine regions at three different tier heights. As illustrated, the first tier region can be found at a first level of the top surface of the phase plate. The second tier region can be found at a second level of the top surface of the phase plate, approximately one (1) micrometer above the first tier region. The third tier region can be found at a third level of the top surface of the phase plate, approximately one (1) micrometer above the second tier region and two (2) micrometers above the first tier region.

Figure 9D:
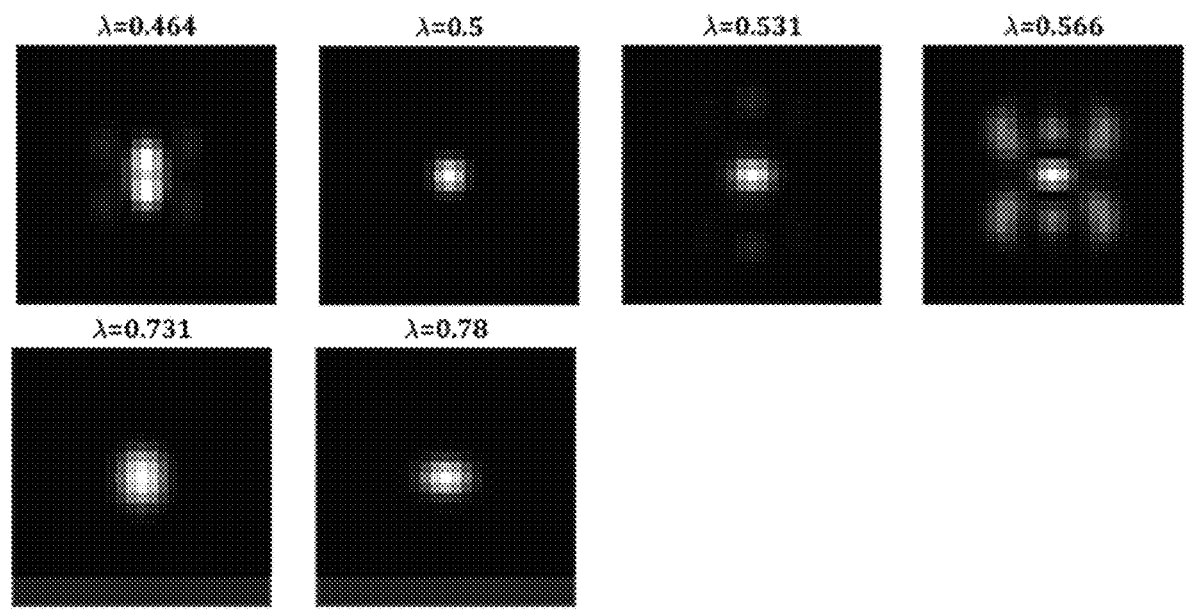
FIG. 9D is an illustration of wavelength dependent geometric patterns for the PSF engineered profile of FIG. 9A having nine regions at three different tiers.

FIG. 9D is an illustration of wavelength dependent geometric patterns produced by the PSF engineered profile 900 of FIG. 9A. As can be seen, the PSF engineered profile 900 produces a distinctive color-to-shape mapping. As illustrated, the PSF engineered profile 900 can produce a pattern that is radially symmetric about a central axis.

Figure 9E:
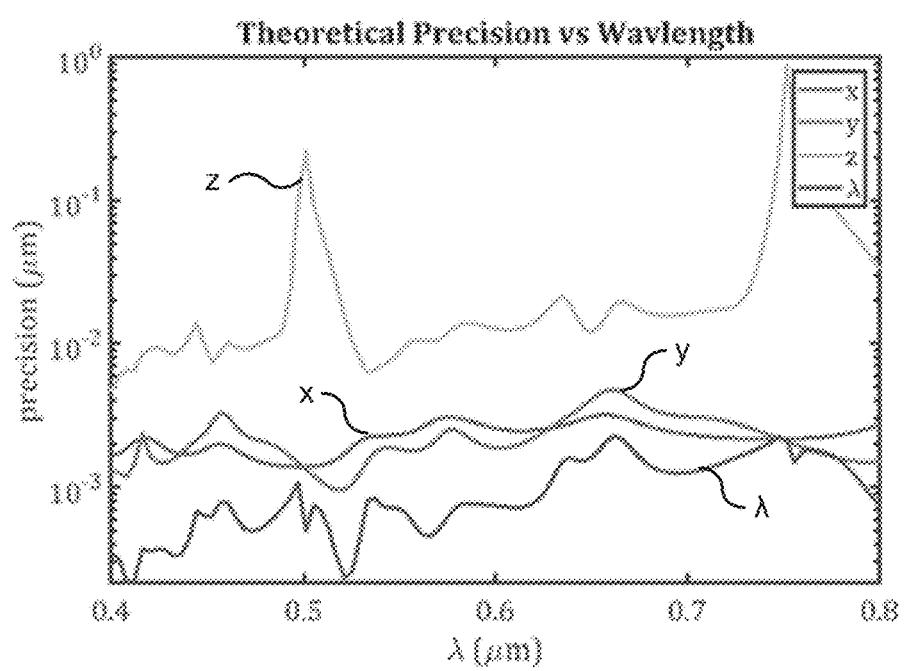
FIG. 9E is a graph illustrating the theoretically minimal statistical uncertainty associated with extracting x, y, z, and λ from an optical signal using the PSF engineered profile of FIG. 9A having nine regions at three different tiers.

FIG. 9E is a graph illustrating the theoretically minimal statistical uncertainty associated with extracting x, y, z, and λ from an optical signal using the PSF engineered profile of FIG. 9A.

Figure 10A:
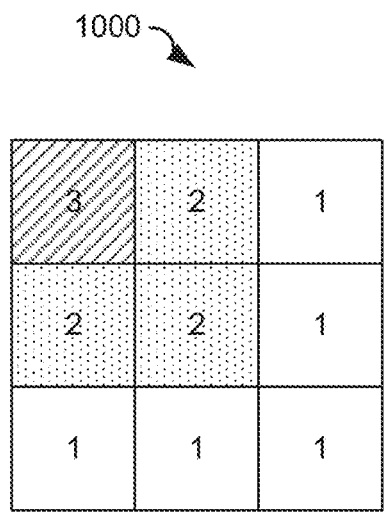
FIG. 10A is a diagram of an PSF engineered profile on a substrate having nine regions at three different tiers for a phase plate for high precision wavelength extraction according to one aspect of the present invention.

FIG. 10A is a diagram of yet another PSF engineered profile 1000 on a substrate having nine regions at three different tier heights for a phase plate for high precision wavelength extraction. The first tier region, denoted by the number 1, can include one region of a top surface of the phase plate. The second tier region, denoted by the number 2, can include one region of the top surface of the phase plate having a different thickness relative to the first tier region. The third tier region, denoted by the number 3, can include one region of the top surface of the phase plate having a different thickness relative to the second tier region. The first, second, third, and fourth tier regions can be arranged to form a stepped pattern.

Figure 10B:
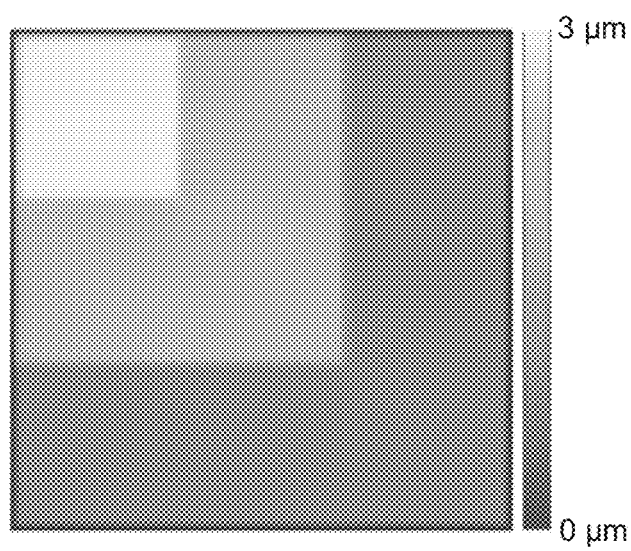
FIG. 10B is a height-map diagram of the PSF engineered profile of FIG. 10A having nine regions at three different tiers according to one aspect of the present invention.

FIG. 10B is a height-map diagram of the PSF engineered profile of FIG. 10A having nine regions at three different tiers according to one embodiment of the present invention. The first tier region (denoted by the darkest color) and the third tier region (denoted by the lightest color) can have a relative thickness of three (3) micrometers as indicated by the color scale gradient between 0 and 3 micrometers. The second tier region can be relatively thicker than the first tier region and less than the third tier region.

Figure 10C:
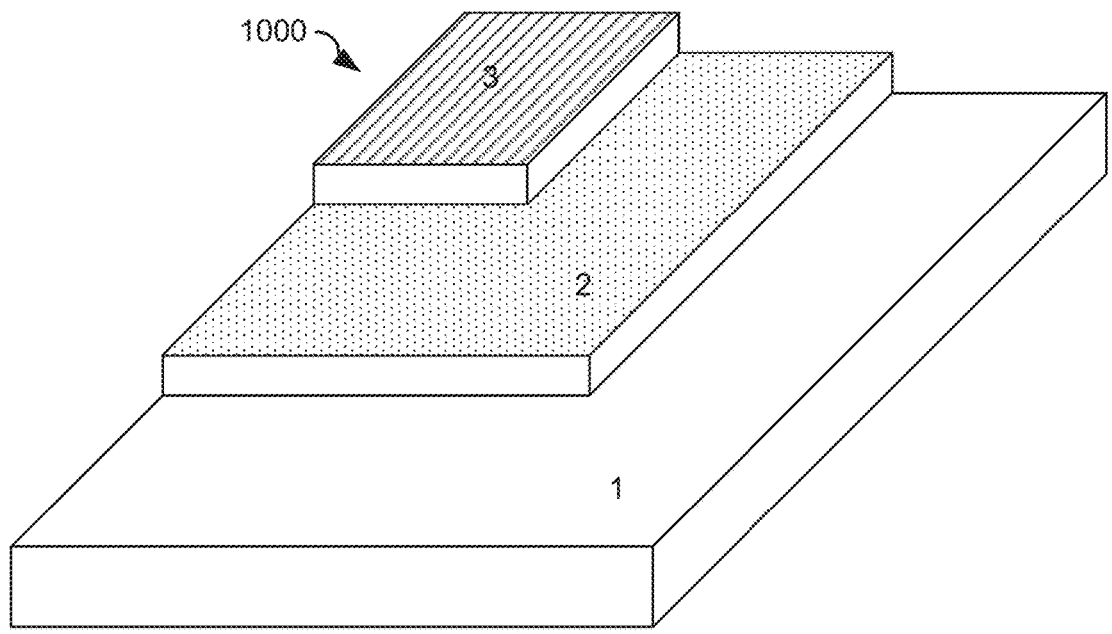
FIG. 10C is a perspective view of the PSF engineered profile of FIG. 10A having nine regions at three different tiers.

FIG. 10C is a perspective view of the PSF engineered profile of FIG. 10A having nine regions at three different tier heights. The second tier region can be found at a second level of the top surface of the phase plate, approximately one (1) micrometer above the first tier region. The third tier region can be found at a third level of the top surface of the phase plate, approximately one (1) micrometer above the second tier region and two (2) micrometers above the first tier region.

Figure 10D:
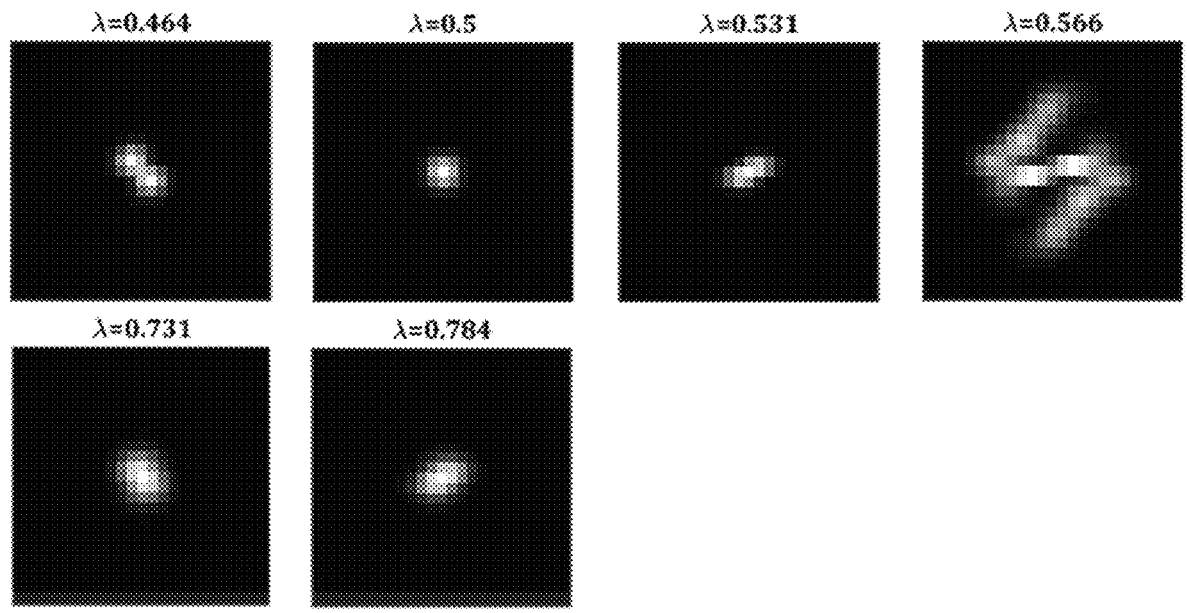
FIG. 10D is an illustration of wavelength dependent geometric patterns for the PSF engineered profile of FIG. 10A having nine regions at three different tiers.

FIG. 10D is an illustration of wavelength dependent geometric patterns produced by the PSF engineered profile 1000 of FIG. 10A. Once again, the PSF engineered profile 1000 produces a distinctive color-to-shape mapping. As illustrated, the PSF engineered profile 1000 can produce a pattern that is radially symmetric about a central axis.

Figure 10E:
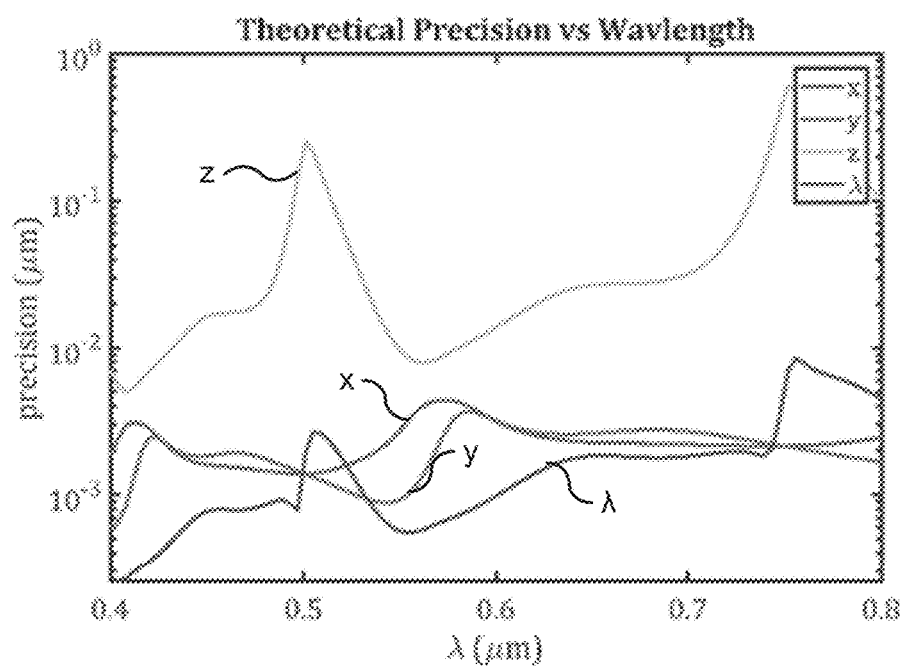
FIG. 10E is a graph illustrating the theoretically minimal statistical uncertainty associated with extracting x, y, z, and λ from an optical signal using the PSF engineered profile of FIG. 10A having nine regions at three different tiers.

FIG. 10E is a graph illustrating the theoretically minimal statistical uncertainty associated with extracting x, y, z, and λ from an optical signal using the PSF engineered profile of FIG. 10A.

Figure 11:
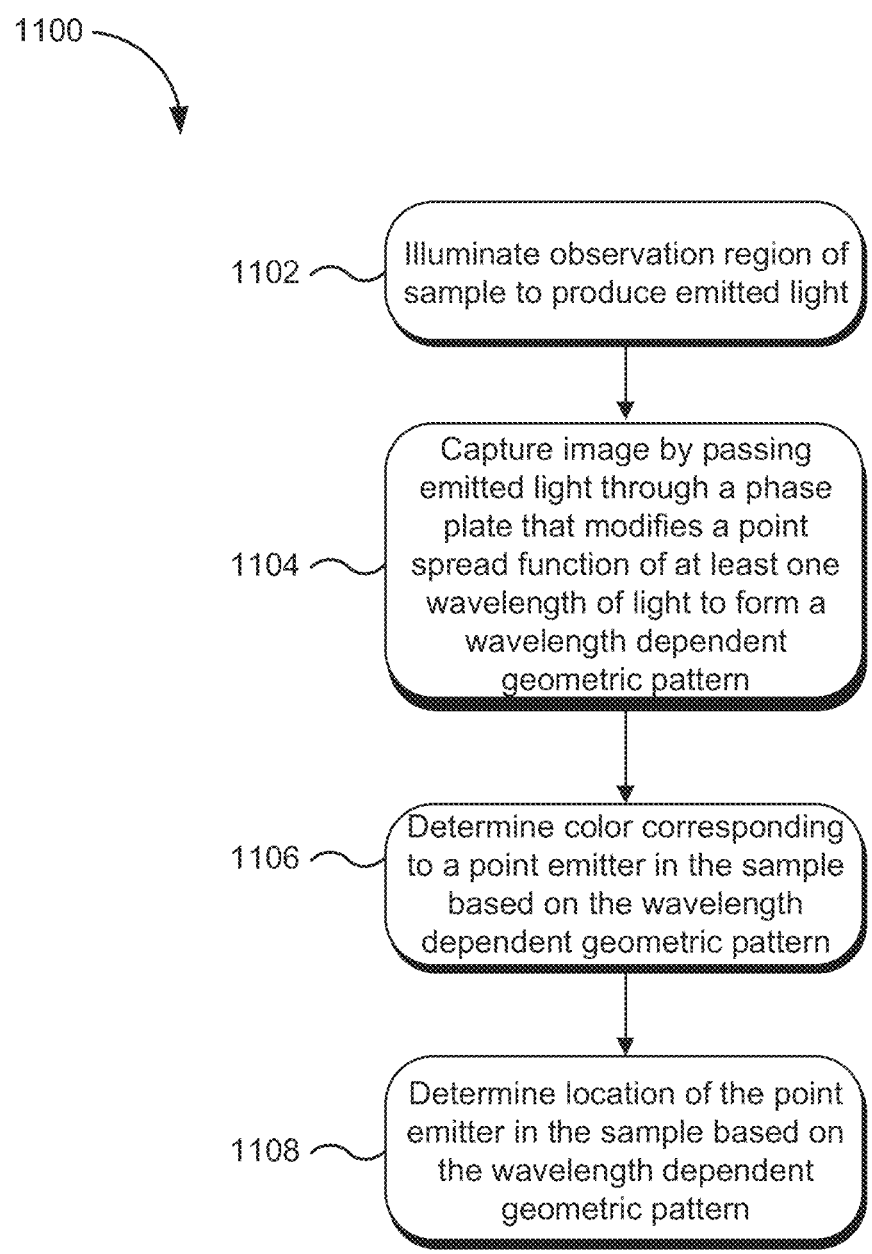
FIG. 11 is a flowchart of a method for high precision wavelength extraction according to one aspect of the present invention.

FIG. 11 is a flowchart of a method 1100 for high precision wavelength extraction according to one embodiment of the present invention. The method 1100 can be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. The method 1100 enables the high precision wavelength extraction from light sources using a phase plate with a PSF engineered profile to produce a distinctive color-to-shape mapping.

In step 1102, a device illuminates an observation region of a sample to produce emitted light. The observation region can be illuminated using ambient, indirect, or direct light. In step 1104, the device captures an image by passing the emitted light through a phase plate that modifies a point spread function of at least one wavelength of light to form a wavelength dependent geometric pattern. In step 1106, the device or observer determines a color corresponding to a point emitter in the sample based on the wavelength dependent geometric pattern. In optional step 1108, the device determines a location of the point emitter in the sample based on the wavelength dependent geometric pattern.

Advantageously, the methods and systems herein can be used for motion tracking. This can be particularly useful for tracking of particular proteins or biological markers. For example, the method can also include capturing a second image of the point emitter at a subsequent time step within the observation region by passing the emitted light through the phase plate. Motion of the point emitter can then be determined within the observation region in response to analyzing spatial differences between the first and second images. This information can be used to track specific point light sources which can be associated with specific physiological structures, proteins, or other features. One specific example of this is tracking two or more different types of molecular motors, tagged with bio-markers, simultaneously. Another application of the color sensitivity of the phase plate would be to use the small spectral shifts of fluorescent bio-markers to sense changes in cellular environments in real time, and with respect to position within the cell. Finally, in a similar mode, using bio-markers attached to proteins, one can measure changes in the conformation of those proteins using the small spectral shifts of the bio-markers in response to those conformational changes.

A color corresponding to a second point emitter can also be based on the wavelength dependent geometric pattern of the other point emitter. In this manner, multiple different features can be tracked simultaneously using a common phase plate and microscope system. For example, a location of the other point emitter can be determined within the observation region based on the wavelength dependent geometric pattern of the other point emitter and comparison of earlier spatial information for that point emitter. Alternatively, relative motion can be determined within the observation region between the tracked point emitters.

Figure 12:
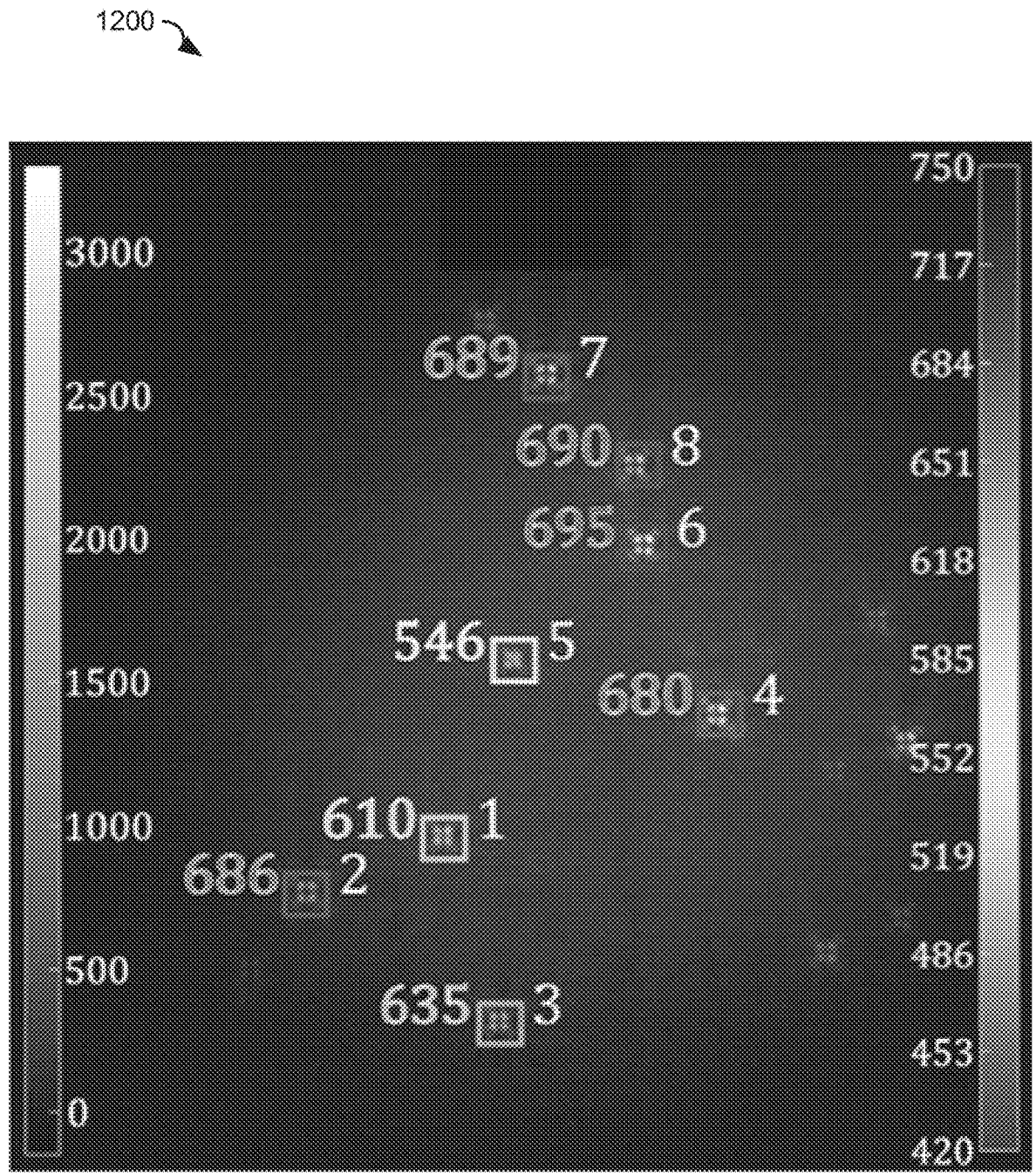
FIG. 12 is user interface illustrating high precision wavelength extraction according to one aspect of the present invention.

FIG. 12 is a user interface 1200 illustrating high precision wavelength extraction. The user interface 1200 can display one or more images captured from emitted light passed through a phase plate that modifies a point spread function of at least one wavelength of light to form a wavelength dependent geometric pattern. The user interface 1200 can include one or more user interface elements that annotate one or more wavelength dependent geometric patterns with corresponding spatial and wavelength localization information. Such a display can be used to manually identify and correlate the geometric pattern with particular wavelengths. Alternatively, such data can be communicated to a processor which includes image recognition algorithms which correlate the geometric patterns with wavelengths.

Figure 13A:
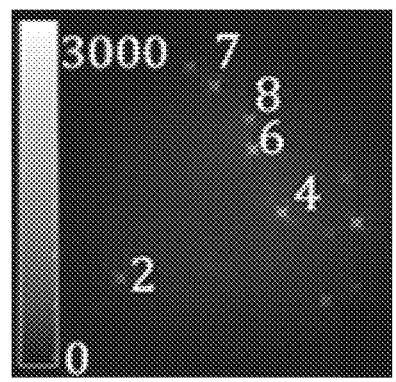
FIGS. 13A-C are images depicting spatial and wavelength localization using high precision wavelength extraction according to one example of the present invention.
Figure 13B:
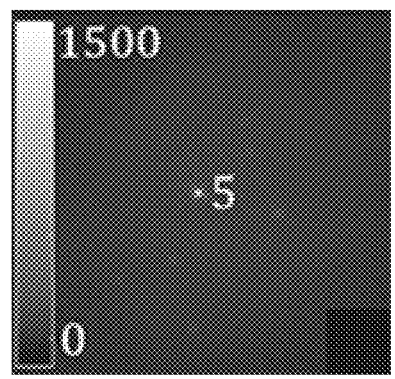
Figure 13C:
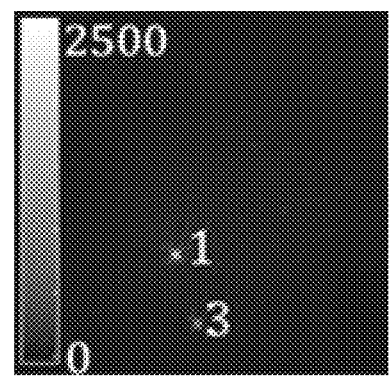

FIGS. 13A-C are images depicting spatial and wavelength localization using high precision wavelength extraction according to one embodiment of the present invention. These show the controls for FIG. 12. In FIG. 12 there are three different colors of fluorescent beads.

Figure 14:
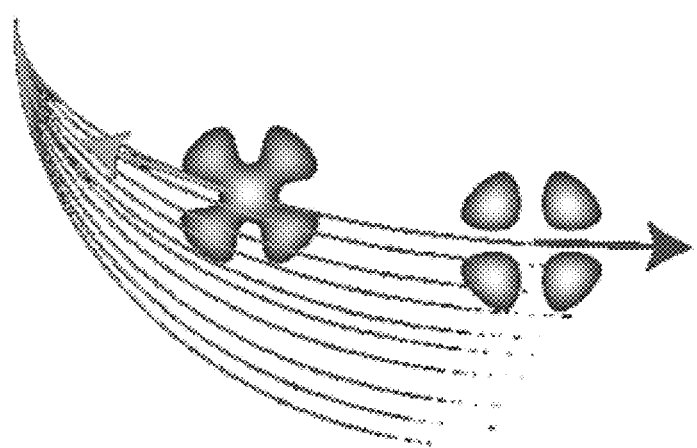
FIG. 14 is an illustration depicting an application of spatial and wavelength localization using high precision wavelength extraction according to one aspect of the present invention.

FIG. 14 is an illustration depicting an application of spatial and wavelength localization using high precision wavelength extraction where the geometric pattern changes as a function of wavelength. This particular example correlates to FIG. 3D showing what the data should look like from an experiment in which two different types of molecular motors are tagged with fluorescent bio-markers. Moving in opposite directions along one of a group of micro tubules (blue curved lines). Each species of motor is labeled with its own color of bio-marker, and they can be distinguished from each other because their unique PSFs.

Figure 15:
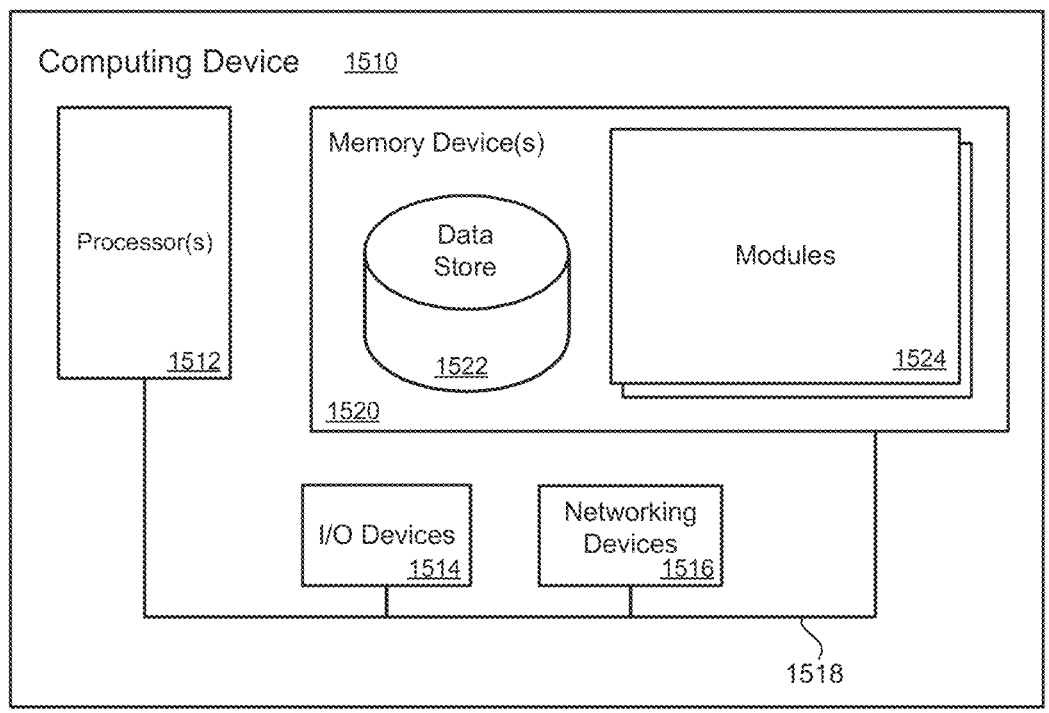
FIG. 15 is an illustration of a computing device which may implement methods or operations for high precision wavelength extraction according to one aspect of the present invention.

FIG. 15 is an illustration of a computing device 1510 which can implement methods or operations for high precision wavelength extraction from point light sources. The computing device 1510 is illustrated on which a high level example of which various described methods or operations can be executed. The computing device 1510 can include one or more processors 1512 that are in communication with memory devices 1520. The computing device 1510 can include a local communication interface 1518 for the components in the computing device. For example, the local communication interface can be a local data bus and/or any related address or control busses as may be desired.

The memory device 1520 can contain modules that are executable by the processor(s) 1512 and data for the modules. Located in the memory device 1520 are modules executable by the processor. For example, a high precision wavelength extraction module and other modules can be located in the memory device 1520. The modules can execute the functions described earlier. A data store 1522 can also be located in the memory device 1520 for storing data related to the modules and other applications along with an operating system that is executable by the processor(s) 1512.

Other applications can also be stored in the memory device 1520 and can be executable by the processor(s) 1512. Components or modules discussed in this description that can be implemented in the form of software using high programming level languages that are compiled, interpreted or executed using a hybrid of the methods.

The computing device can also have access to I/O (input/output) devices 1514 that are usable by the computing devices. An example of an I/O device is a display screen 1540 that is available to display output from the computing devices. Other known I/O device can be used with the computing device as desired. Networking devices 1516 and similar communication devices can be included in the computing device. The networking devices 1516 can be wired or wireless networking devices that connect to the internet, a LAN, WAN, or other computing network.

The components or modules that are shown as being stored in the memory device 1520 can be executed by the processor(s) 1512. The term "executable" can mean a program file that is in a form that can be executed by a processor 1512. For example, a program in a higher level language can be compiled into machine code in a format that can be loaded into a random access portion of the memory device 1520 and executed by the processor 1512, or source code can be loaded by another executable program and interpreted to generate instructions in a random access portion of the memory to be executed by a processor. The executable program can be stored in any portion or component of the memory device 1520. For example, the memory device 1520 can be random access memory (RAM), read only memory (ROM), flash memory, a solid state drive, memory card, a hard drive, optical disk, floppy disk, magnetic tape, or any other memory components.

The processor 1512 can represent multiple processors and the memory 1520 can represent multiple memory units that operate in parallel to the processing circuits. This can provide parallel processing channels for the processes and data in the system. The local interface 1518 can be used as a network to facilitate communication between any of the multiple processors and multiple memories. The local interface 1518 can use additional systems designed for coordinating communication such as load balancing, bulk data transfer and similar systems.

Figure 16A:
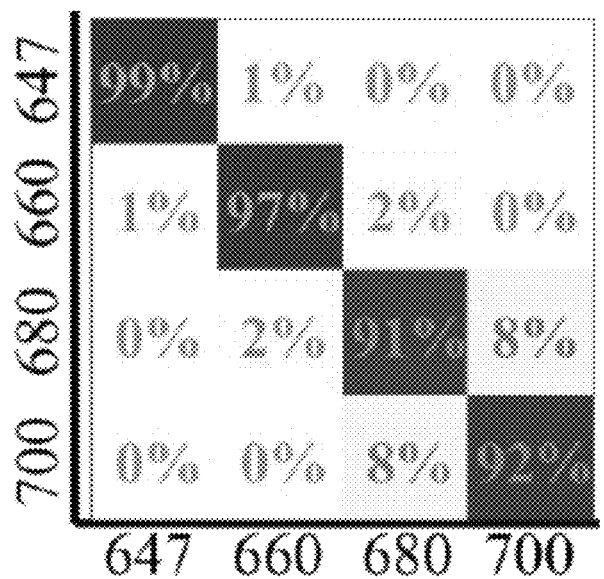
FIG. 16A is a truth table for results of Monte Carlo spectral identification using the principles of one example variation of the invention.

A variety of optimization approaches can be used as described herein to optimize spectral sensitivity. For example, by introducing a phase mask into the Fourier plane (FP) of a microscope (FIG. 16C), the PSF can be made very sensitive to emission spectra. In this way fluorescent tags can be imaged simultaneously with negligible cross-talk. To optimize such a PSF, a figure of merit (FOM) called pixel confusion can be used to characterize the probability that a given pixel will have the same photon count for two different emission spectra.

Figure 16B:
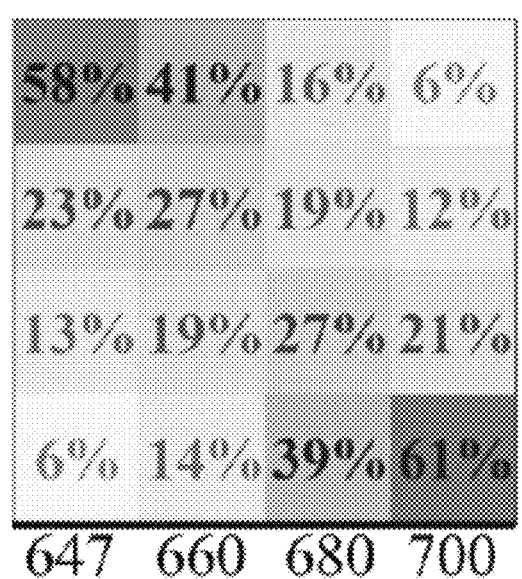
FIG. 16B is a truth table for an Airy spot of the examples from FIG. 16A.
Figure 16C:
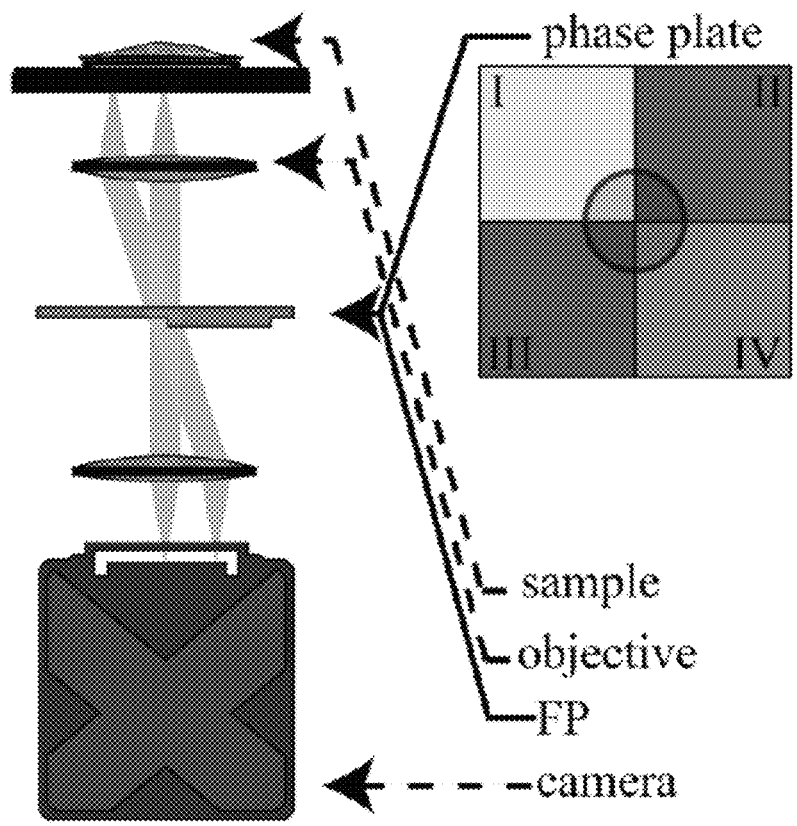
FIG. 16C is a schematic of one system example of the present invention.
Figure 16D:
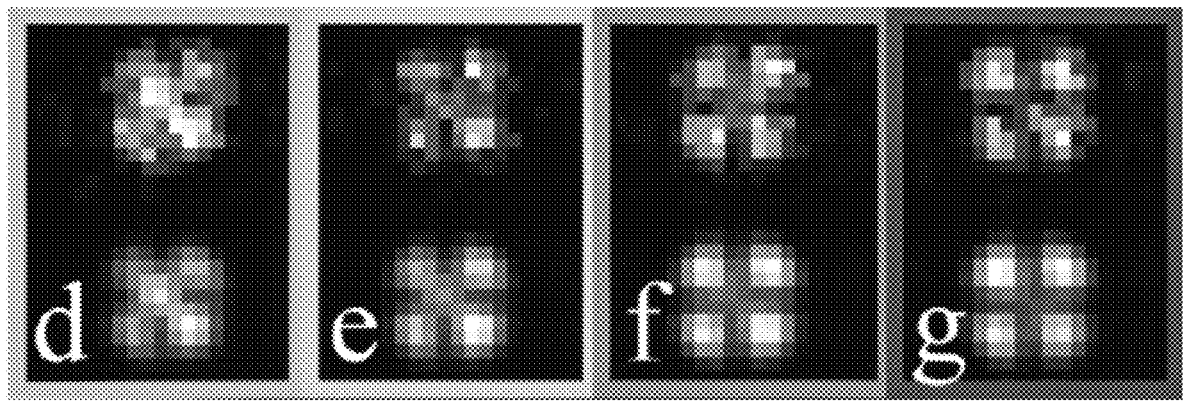
FIG. 16D are simulated average optimal PSFs (bottom) and noisy optimal PSFs (top) arranged in order of increasing peak wavelength. The minimization was performed using particle swarm optimization.
Figure 16E:
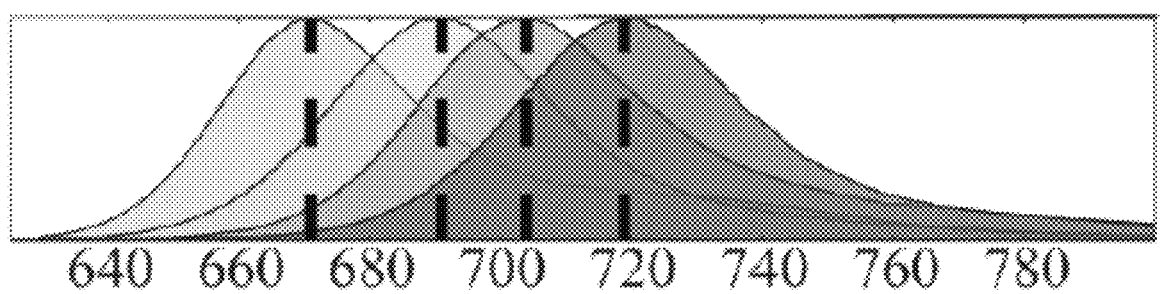
FIG. 16E is an optimized spectra of four commonly used dyes (Alexa Fluors 647, 660, 680, 700) showing a high degree of overlap.

More specifically, for two PSFs, $x_1$ and $x_2$, centered on the same region of a camera. If $x_1$ and $x_2$ have different spectra then their PSFs will differ based on the design of the phase plate. If the photon count, $x_i$ of the $i^{th}$ pixel between the measurements of $x_1$ and $x_2$ is the same, then the pixel can be termed confused. Assuming Poissonian detection statistics, the average probability of confusion (POC), over all of the pixels K of the region of interest, is:

$$\langle P(X_1 = X_2) \rangle = \frac{1}{K} \sum_{i=1}^{K} \sum_{x_i=0}^{\infty} poiss(\mu_{1,i}, x_i) poiss(\mu_{2,i}, x_i) \rightarrow$$

$$\frac{1}{K} \sum_{i=1}^{K} \exp(-\mu_{1,i} - \mu_{2,i}) I_0(2\sqrt{\mu_{1,i}\mu_{2,i}})$$

where $\mu_{1,i}, \mu_{2,i}$ are the expected photon rates for $x_1, x_2$ at the $i^{th}$ pixel. The function is $I_0(\ )$ a modified Bessel function of the first kind, zero order and poiss ($\mu_{1,i}, x_i$) denotes the Poisson distribution with rate, $\mu_{1,i}$ and argument, $x_i$. Minimizing the POC between $x_1, x_2$ will yield a phase mask that allows distinguishing between their respective spectra. As an example, a phase mask was optimized for the spectra of four commonly used organic dyes, simultaneously. This involved averaging the POC over all unique pairs $(l,m)=(m,l)$ for $\langle P(X_l=X_m) \rangle$, $\ni m, l \in [1,4]$. These spectra—Alexa Fluors 647, 660, 680, 700 have a high degree of overlap (FIG. 16E). After minimizing the POC, the PSF showed a large improvement in correct spectral identification (FIG. 16A) over an Airy spot (FIG. 16B). This approach can also be extended to multi-color experiments using red dyes.

Alternatively, a numerical optimization process can be used to simultaneously minimize a Cramer-Rao lower bound at several wavelengths of interest. In another alternative, a Monte Carlo technique can be used to optimize spectral sensitivity by simulating PSFs with different colors and then subsequently using a machine learning algorithm to select the PSF having a strongest correlation (see Hershko et al., *Multicolor localization microscopy and point-spread-function engineering by deep learning*, Optics Express Vol. 27, Issue 5, pp. 6158-6183 (2019) which is incorporated herein by reference). Such approaches rely on chromatic dependence of PSFs.

While the flowcharts presented for this technology can imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules can also be implemented in software for execution by various types of processors. An identified module of executable code may, for instance, comprise one or more blocks of computer instructions, which may be organized as an object, procedure, or function. Nevertheless, the executables of an identified module need not be physically located together, but can comprise disparate instructions stored in different locations which comprise the module and achieve the stated purpose for the module when joined logically together.

Indeed, a module of executable code can be a single instruction, or many instructions and can even be distributed over several different code segments, among different programs and across several memory devices. Similarly, operational data can be identified and illustrated herein within modules and can be embodied in any suitable form and organized within any suitable type of data structure. The operational data can be collected as a single data set, or can be distributed over different locations including over different storage devices. The modules can be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein can also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics can be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A phase plate for a microscope system, comprising:
   a planar substrate being transparent to a wavelength of light from a point light source passing through a bottom surface, a substrate body, and a top surface of the substrate,
   the top surface including a point spread function engineered profile formed as a segmented array of regions including at least a first tier region and a second tier region, and
   the first and second tier regions each having a different thickness that transforms a point spread function of the wavelength of light to form a wavelength dependent geometric pattern.

2. The phase plate of claim 1, wherein the planar substrate comprises at least one of $SiO_2$, glass, quartz, mica, and $Al_2O_3$.

3. The phase plate of claim 1, wherein the top surface has a surface roughness (Ra) less than about 3 nm.

4. The phase plate of claim 1, wherein the segmented array of regions form a regular tessellation of squares.

5. The phase plate of claim 4, wherein the regular tessellation is a 2×2 grid, a 3×3 grid or a 4×4 grid.

6. The phase plate of claim 1, wherein the point spread function engineered profile has a reflection symmetry.

7. The phase plate of claim 1, wherein the point spread function engineered profile has a radial symmetry about a central axis of the top surface.

8. The phase plate of claim 1, wherein the wavelength dependent geometric pattern comprises a spatially centered shape which preserves a spatial location of the point light source.

9. The phase plate of claim 1, wherein the point spread function engineered profile includes at least three tier regions having at least three different tier heights.

10. A method comprising:
    illuminating an observation region of a sample to produce an emitted light of at least one wavelength of light;
    capturing a first image of a point emitter within the observation region by passing the emitted light through a phase plate, wherein the phase plate includes a transparent substrate having a top surface, a substrate body, and a bottom surface, the top surface including a point spread function engineered profile formed of a tessellation of regions including at least a first tier region and a second tier region, and wherein the first and second tier regions each have a different thickness that modifies a point spread function of the at least one wavelength of light to form a wavelength dependent geometric pattern; and
    determining a color corresponding to the point emitter based on the wavelength dependent geometric pattern of the point emitter in response to analyzing the first image.

11. The method of claim 10, further comprising determining a location of the point emitter within the observation region based on the wavelength dependent geometric pattern of the point emitter in response to analyzing the first image.

12. The method of claim 10, wherein the first and second tier regions form a regular square tessellation.

13. The method of claim 10, wherein the point spread function engineered profile has a radial symmetry about a central axis of the top surface.

14. The method of claim 10, wherein the point spread function engineered profile has a reflection symmetry and is a spatially centered shape which preserves a spatial location of the emitted light.

15. The method of claim 14, further comprising capturing a second image of the point emitter at a subsequent time, and determining motion of the point emitter.

16. A fluorescence microscopy imaging device comprising:
- an optional illumination source positioned to illuminate an observation region of a sample at least one wavelength of light;
- an imaging sensor positioned to capture light from the sample to form an image;
- imaging optics positioned to direct light from the sample to the imaging sensor; and
- a phase plate of claim 1 positioned at the Fourier plane of the imaging optics.

17. The fluorescence microscopy imaging device of claim 16, further comprising a detector adapted to detect differing chromatic forms in the image.

18. The fluorescence microscopy imaging device of claim 16, further comprising a display device adapted to display the image, the image comprising a wavelength dependent geometric pattern representing a point emitter in the sample.

* * * * *